(12) United States Patent
Liang et al.

(10) Patent No.: US 9,501,468 B2
(45) Date of Patent: *Nov. 22, 2016

(54) NLP-BASED SYSTEMS AND METHODS FOR PROVIDING QUOTATIONS

(71) Applicant: VCVC III LLC, Seattle, WA (US)

(72) Inventors: Jisheng Liang, Bellevue, WA (US); Navdeep S. Dhillon, Seattle, WA (US); Krzysztof Koperski, Seattle, WA (US)

(73) Assignee: VCVC III LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,137

(22) Filed: Jun. 23, 2015

(65) Prior Publication Data

US 2015/0317301 A1 Nov. 5, 2015

Related U.S. Application Data

(63) Continuation of application No. 14/169,972, filed on Jan. 31, 2014, now Pat. No. 9,092,416, which is a continuation of application No. 13/075,799, filed on Mar. 30, 2011, now Pat. No. 8,645,125.

(60) Provisional application No. 61/319,029, filed on Mar. 30, 2010.

(51) Int. Cl.
| G06F 17/27 | (2006.01) |
| G06F 17/28 | (2006.01) |
| G06F 17/30 | (2006.01) |

(52) U.S. Cl.
CPC ......... *G06F 17/278* (2013.01); *G06F 17/2705* (2013.01); *G06F 17/2775* (2013.01); *G06F 17/28* (2013.01); *G06F 17/30684* (2013.01)

(58) Field of Classification Search
CPC ... G10L 13/00; G10L 13/043; G10L 13/033; G10L 13/08; G10L 13/02; G10L 15/24; G10L 2201/105; G06F 3/04883; G06F 17/27; G06F 17/30011; G06F 17/30864; G06F 17/211; G06F 17/2818; G06F 17/3061; G06F 17/30705; G06F 17/30867; G06F 17/30884; G06F 17/2211; G06F 17/2229; G06F 17/2235; G06F 17/30038; G06F 17/241; G06F 17/218; G06F 17/30728; G06F 17/279; G06F 17/3002; G06F 17/30619
USPC .............. 704/1–10, 250, 251, 255, 257, 270
See application file for complete search history.

(56) References Cited

U.S. PATENT DOCUMENTS

| 7,529,756 | B1 * | 5/2009 | Haschart ........... G06F 17/30728 |
| 7,788,084 | B2 * | 8/2010 | Brun ..................... G06F 17/271 704/7 |
| 8,132,103 | B1 * | 3/2012 | Chowdhury ...... G06F 17/30056 715/720 |

*Primary Examiner* — Huyen Vo
(74) *Attorney, Agent, or Firm* — Ellen M. Bierman; Lowe Graham Jones PLLC

(57) ABSTRACT

Techniques for providing quotations obtained from text documents using natural language processing techniques are described. Some embodiments provide a content recommendation system ("CRS") configured to provide quotations by extracting quotations from a corpus text documents, and providing access to the extracted quotations in response to search requests received from users. The CRS may extract quotations by using natural language processing-based techniques to identify one or more entities, such as people, places, objects, concepts, or the like, that are referenced by the extracted quotations. The CRS may then store the extracted quotations along with identified entities, such as quotation speakers and subjects, for later access via search requests.

22 Claims, 17 Drawing Sheets

NLP-BASED SYSTEMS AND METHODS FOR PROVIDING QUOTATIONS

CROSS-REFERENCE TO RELATED APPLICATIONS

This application is a continuation of U.S. application Ser. No. 14/169,972 filed Jan. 31, 2014, entitled "NLP-BASED SYSTEMS AND METHODS FOR PROVIDING QUOTATIONS," which is a continuation of U.S. application Ser. No. 13/075,799 filed Mar. 30, 2011, entitled "NLP-BASED SYSTEMS AND METHODS FOR PROVIDING QUOTATIONS," which claims the benefit of U.S. Patent Application No. 61/319,029, entitled "NLP-BASED SYSTEMS AND METHODS FOR PROVIDING QUOTATIONS," filed Mar. 30, 2010, all of which are incorporated herein by reference, in their entireties.

TECHNICAL FIELD

The present disclosure relates to techniques for providing quotations and, in particular, to methods, systems, and techniques for extracting, attributing, indexing, and searching for quotations from text documents using natural language processing based techniques.

BRIEF DESCRIPTION OF THE DRAWINGS

FIGS. 3A-3H illustrate example screen displays provided by an example embodiment of a content recommendation system.

FIGS. 4A-4D illustrate additional example screen displays provided by an example embodiment of a content recommendation system.

DETAILED DESCRIPTION

Figure 1:
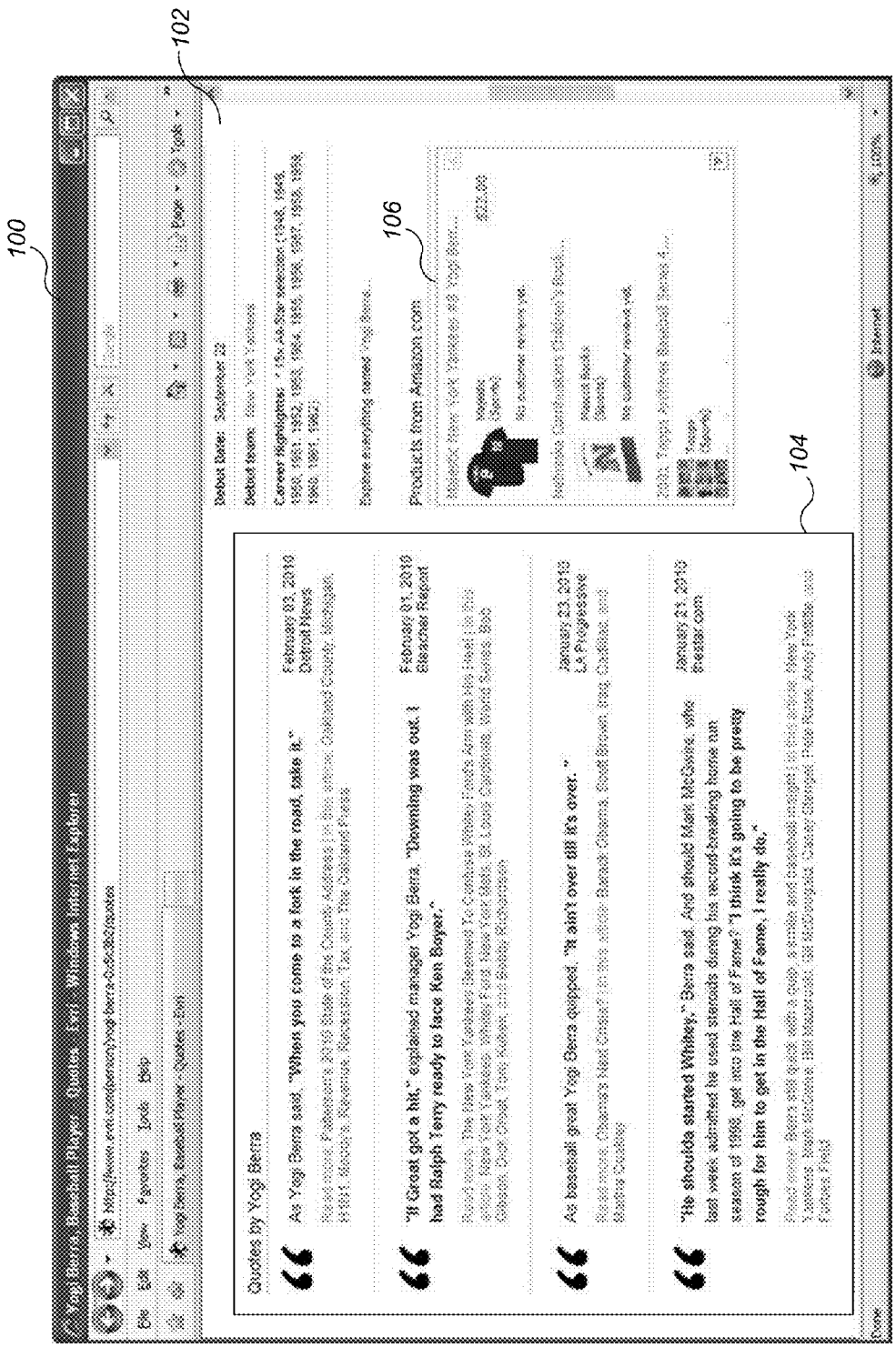
FIG. 1 illustrates an example screen display that includes quotations provided by an example embodiment of a content recommendation system.

Embodiments described herein provide enhanced computer- and network-based methods and systems for providing quotations. Example embodiments provide a content recommendation system ("CRS") configured to recommend content items such as entity information, documents, video, advertisements, product information, and the like. As part of a content recommendation process, in some embodiments, the CRS is configured to provide quotations by extracting quotations from text documents and providing access to the extracted quotations in response to search requests received from users. Extracting a quotation from a text document includes identifying the quotation in the text document, as well as information about the identified quotation. Information about the identified quotation may include a textual or other representation of the quotation (e.g., what was said), an entity to which the quotation is attributed (e.g., a speaker of the quotation), entities that are referenced by the quotation (e.g., the subject of the quotation), and/or relationships between entities referenced by the quotation, or other context. Entities include people, places (e.g., locations), organizations (e.g., political parties, corporations, groups), events, concepts, products, substances, and the like. Table 4, below, includes a list of example entity types. Fewer or more entity types may be available. Information about a quotation may also or instead include various types of meta-information, such as the title of an article or document in which the quotation appears, a publication date, a credibility indication, and the like.

The CRS is further configured to store (e.g., index) the extracted quotations and corresponding information, such as quotation speaker and subject entities. Information about entities (e.g., entity name, entity type, and the like) and the relationships between them are represented and stored by the CRS, such that quotations can be accessed based on the entities associated therewith and based upon semantic relationships with those entities. In one embodiment, as discussed further below, the indexed quotations are recognized and stored according to natural language processing ("NLP") techniques such that details of the quotations and their context can be "understood" by the CRS, beyond what keyword based pattern matching will yield.

For example, in some embodiments, once the CRS has extracted quotations from a corpus of text documents, a user can interact with the CRS (e.g., via an interactive user interface) to search for quotations. Because the CRS has indexed not only quotation text, but various types of information about the quotations (e.g., speaker entities, subject entities, categorizations of the speakers, parts-of-speech related information, etc.), the CRS can provide search functionality that can be utilized to request quotations matching a rich set of search expressions. In one example embodiment, in addition to requesting all quotations by a particular speaker, a user can request all quotations by a particular speaker (e.g., Barack Obama) about a particular subject (e.g., health care).

In addition, in some embodiments, entities have one or more associated facets, which include finely grained characteristics of entities such as entities, types, and/or characteristics. Example facets include actor, politician, athlete, nation, drug, sport, automobile, and the like. In such embodiments, users can search for quotations based on facet specifications. For example, a user can request all quotations by a particular class of speaker (e.g., a politician) about a particular class of subject (e.g., sports). Table 5, below, includes a list of example facets for the various entity types used in one embodiment. Other expressive search functionality is contemplated and supported by various embodiments, as discussed below.

FIG. 1 illustrates an example screen display that includes quotations provided by an example embodiment of a content recommendation system. In particular, FIG. 1 illustrates a Web browser 100 that displays a screen 102 (e.g., a Web page) that is being used by a user to interact with the content recommendation system. The screen 102 includes a related quotations area 104 and an advertisements section 106. The related quotations area 104 displays quotations by a particular entity, in this example, Yogi Berra. Each displayed quotation includes the text of the quotation, the speaker of the quotation, a document title (e.g., the headline of a new article in which the quotation appeared), a source (e.g., the publication in which the quotation appeared), a publication date (e.g., the date the quotation was published and/or uttered), and context information, such as indications of one or more entities referenced by the quotation and/or the document in which the quotation appears. Some embodiments of the CRS automatically determine one or more advertisements that are related to one or more of the displayed quotations, and display such advertisements in the advertisements section 106. In the illustrated example, the advertisements section 106 displays advertisements that are related to the speaker of the displayed quotations (e.g., Yogi Berra) and/or other information about one or more of the displayed quotations, such as a quotation subject.

Figure 2:
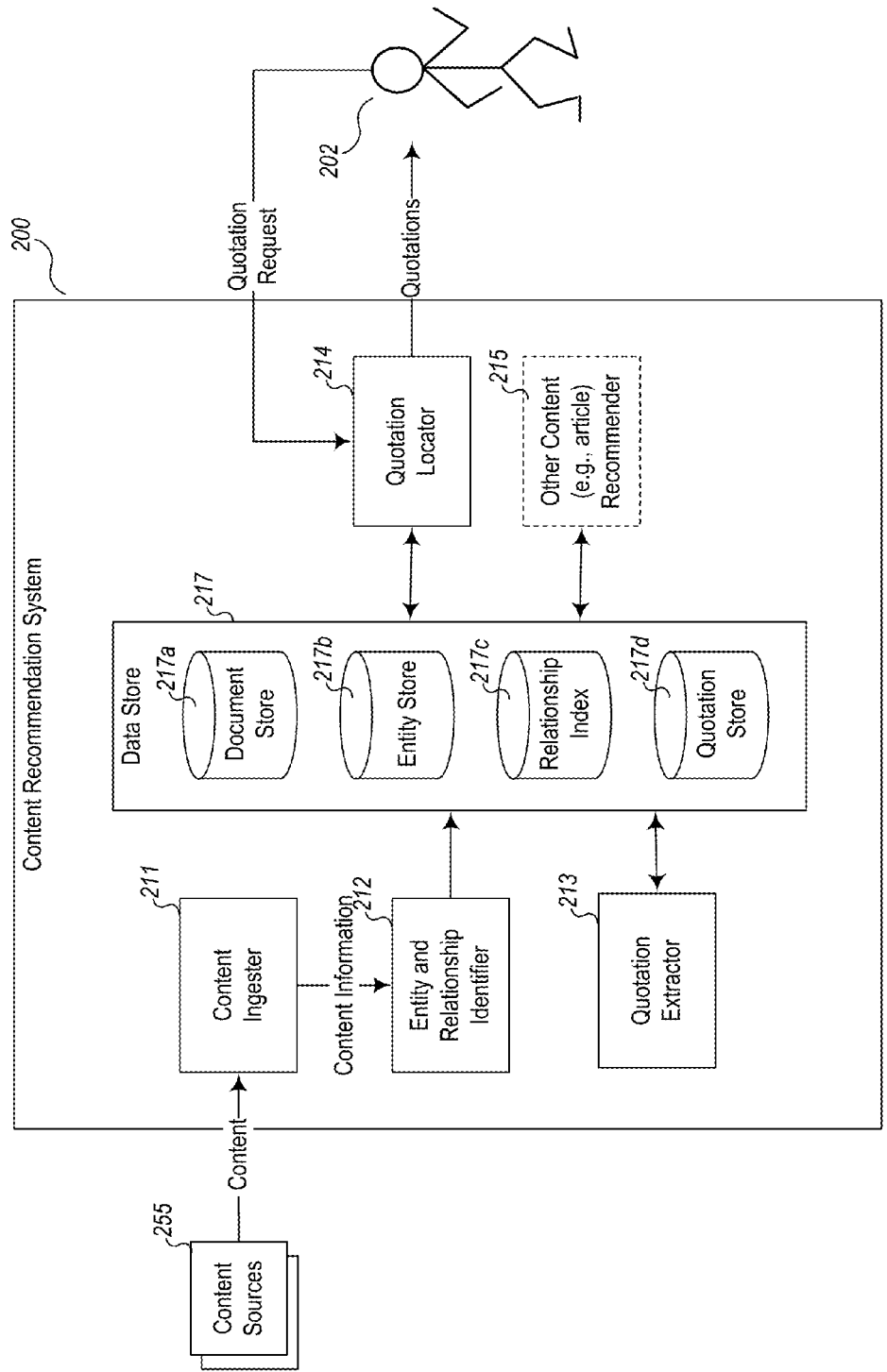
FIG. 2 illustrates an example block diagram of an example embodiment of a content recommendation system used to provide quotations.

FIG. 2 illustrates an example functional block diagram of an example embodiment of a content recommendation system used to provide quotations. In particular, FIG. 2 illustrates a content recommendation system ("CRS") 200 that includes a content ingester 211, an entity and relationship identifier 212, a quotation extractor 213, a quotation locator 214, a data store 217, and optionally one or more other content recommenders 215. The data store 217 includes a document store 217a, an entity store 217b, a relationship index 217c, and a quotation store 217d. The content ingester 211 receives and indexes content from various content sources, including sources such as Web sites, Blogs, news feeds, video feeds, and the like. The content ingester 211 may also receive content from non-public or semi-public sources, including subscription-based information services, access-controlled social networks, and the like. The content ingester 211 provides content information, including data included within content items (e.g., text, images, video) and meta-data about content items (e.g., author, title, date, source), to the entity and relationship identifier 212. The content information may be provided directly (as illustrated) and/or via some intermediary, such as the document store 217a.

The entity and relationship identifier 212 receives content information from the content ingester 211 and identifies entities and relationships that are referenced therein. Various automatic and semi-automatic techniques are contemplated for identifying entities within content items. In one embodiment, the identifier 212 uses natural language processing techniques, such as parts of speech tagging and relationship searching, to identify sentence components such as subjects, verbs, and objects, and to identify and disambiguate entities. Example relationship searching technology, which uses natural language processing to determine relationships between subjects and objects in ingested content, is described in detail in U.S. Pat. No. 7,526,425, filed Dec. 13, 2004, and entitled "METHOD AND SYSTEM FOR EXTENDING KEYWORD SEARCHING FOR SYNTACTICALLY AND SEMANTICALLY ANNOTATED DATA" issued on Apr. 28, 2009, and example entity recognition and disambiguation technology is described in detail in U.S. patent application Ser. No. 12/288,158, filed Oct. 15, 2008, and entitled "NLP-BASED ENTITY RECOGNITION AND DISAMBIGUATION," both of which are incorporated herein by reference in their entireties. Amongst other capabilities, the use of relationship searching, enables the CRS 200 to establish second order (or greater order) relationships between entities and to store such information in the data store 217.

For example, given a sentence such as "Sean Connery starred in Goldfinger," the identifier 212 may identify "Sean Connery" as the sentence subject, "starred" as the sentence verb (or action), and "Goldfinger" as the sentence object, along with the various modifiers present in the sentence. These parts-of-speech components of each sentence, along with their grammatical roles and other tags may be stored in the relationship index 217c, for example as an inverted index as described in U.S. Pat. No. 7,526,425. As part of the indexing process, the CRS recognizes and disambiguates entities that are present in the text. Indications of these disambiguated entities are also stored with the sentences information, when the sentence contains uniquely identifiable entities that the CRS already knows about. These entities are those that have been added previously to the entity store 217b. In some cases, the indexed text contains subjects and objects that indicate entities that are not necessarily known or not yet disambiguated entities. In this case the indexing of the sentence may store as much information as it has in index 217c, but may not refer to a unique identifier of an entity in the entity store 217b. Over time, as the CRS encounters new entities, and in some cases with the aid of manual curation, new entities are added to the entity store 217b. In the above example, "Sean Connery" and "Goldfinger" may be unique entities already known to the CRS and present in the entity store 217b. In this case, their identifiers will be stored along with the sentence information in the relationship index 217c. The identified verbs also define relationships between the identified entities. These defined relationships (e.g., stored as subject-action-object or "SAO" triplets, or otherwise) are then stored in the relationship index 217c. In the above example, a representation of the fact that the actor Sean Connery starred in the film Goldfinger would be added to the relationship index 217c. In some embodiments, the process of identifying entities may be at least in part manual. For example, entities may be provisionally identified by the identifier 212, and then submitted to curators (or other humans) for editing, finalization, review, and/or approval.

The entity and relationship identifier 212 may determine various other kinds of information about entities and relationships. In one embodiment, the identifier 212 also determines facets, which include finely grained characteristics of entities, such as entity types, roles, qualities, functions, and the like. For example, the entity Sean Connery may have various associated facets, including that of actor, producer, knight, and Scotsman. The facet information for entities may also be stored in the entity store 217b.

The quotation extractor 213 extracts quotations based on information about content items stored in the data store 217 by the ingester 211 and identifier 212. Extracting quotations from a document may include performing natural language processing upon the document, including linguistic and/or semantic analysis to perform functions such as paragraph and/or sentence detection, parts-of-speech tagging, lexical analysis to detect phrases, semantic analysis to determine how words are used in the document, and the like. In addition, extracting quotations may include identifying entities and associated relationships within the document, disambiguating entities, detecting quotation boundaries and/or verbs, and the like. Further, extracting quotations may include, storing and/or indexing the detected quotations in a data store. In some embodiments, each quotation is represented by the extractor 213 as a triple that includes a speaker, a verb, and a quote, and this triple is recorded in one or more indexes (for example, inverted indexes) stored in the quotation store 217d. Additional information may be stored in association with an extracted quotation, such as entity information (e.g., one or more entity identifiers), speaker modifiers (e.g., terms modifying the quotation speaker), action modifiers (e.g., terms modifying the quotation verb), and the like. Additional techniques for quotation extraction are discussed with reference to FIG. 6 and in the section entitled "Quotation Recommendation Details in an Example Embodiment," below.

The quotation locator 214 provides access to stored (e.g., indexed) quotations based on a received quotation request from a user 202 or some other source. In one embodiment, the received quotation request includes a search query that specifies search information, such as speaker, subject, key-terms, or the like. The quotation locator 214 determines one or more quotations that match, or approximately match, the search query, and provides (e.g., transmits, sends, displays) the determined one or more quotations to the user 202. In some embodiments, the search query uses relationship searching, such as that described in U.S. Pat. No. 7,526,425, to identify matching quotations beyond that provided by simple keyword matching or regular expression techniques. Additional techniques for quotation location are discussed with reference to FIG. 7 and in the section entitled "Quotation Recommendation Details in an Example Embodiment," below.

The other content recommender 215 provides other types of content recommendations, such as for articles, entities, product information, advertisements, and the like. For example, in one embodiment, the other content recommender 215 is or includes an article recommender that determines articles that are related to collections of entities specified by the user 202. In other embodiments, the other content recommender 215 is or includes an entity recommender that determines entities that are related to collections of entities specified by the user 202. One such example entity recommender for use with collections of entities is described in detail in U.S. Patent Application No. 61/309,318, filed Mar. 1, 2010, and entitled "CONTENT RECOMMENDATION BASED ON COLLECTIONS OF ENTITIES," which is incorporated herein by reference in its entirety.

The described techniques herein are not limited to the specific architecture shown in FIG. 2 or described in conjunction with the relationship indexing and searching techniques or the disambiguation techniques described above. For example, in some embodiments, content ingestion and entity and relationship identification may be performed by another (possibly external or remote) system or component. In other embodiments, the CRS 200 may not interact directly with users, but rather provide user interface components (e.g., quotations widgets) that may be embedded or otherwise incorporated in third-party applications or systems, such as Web sites, smart phones, desktop systems, touch devices, personal productivity devices, tablet computers, mobile applications, and the like. In further embodiments, the CRS 200 may provide an application program interface, such that external programs can programmatically receive and/or provide quotations to/from the CRS 200.

In addition, although the described techniques for providing quotations are illustrated primarily with respect to text documents, other forms of content items are contemplated. For example, other embodiments may utilize at least some of the described techniques to provide quotations extracted from other forms of content, including video, audio, and the like. Also, text documents include document types beyond documents represented in a text format (e.g., ASCII or UNICODE documents). In particular, text documents include any documents that have any textual content, independent of format, such as PDF documents, Microsoft Office documents, and the like.

FIGS. 3A-3H illustrate example screen displays provided by an example embodiment of a content recommendation system. More specifically, FIGS. 3A-3H depict a running example, in which a user interacts with a Web site operated by the content recommendation system, in order to obtain quotations by and/or about various entities.

Figure 3A:
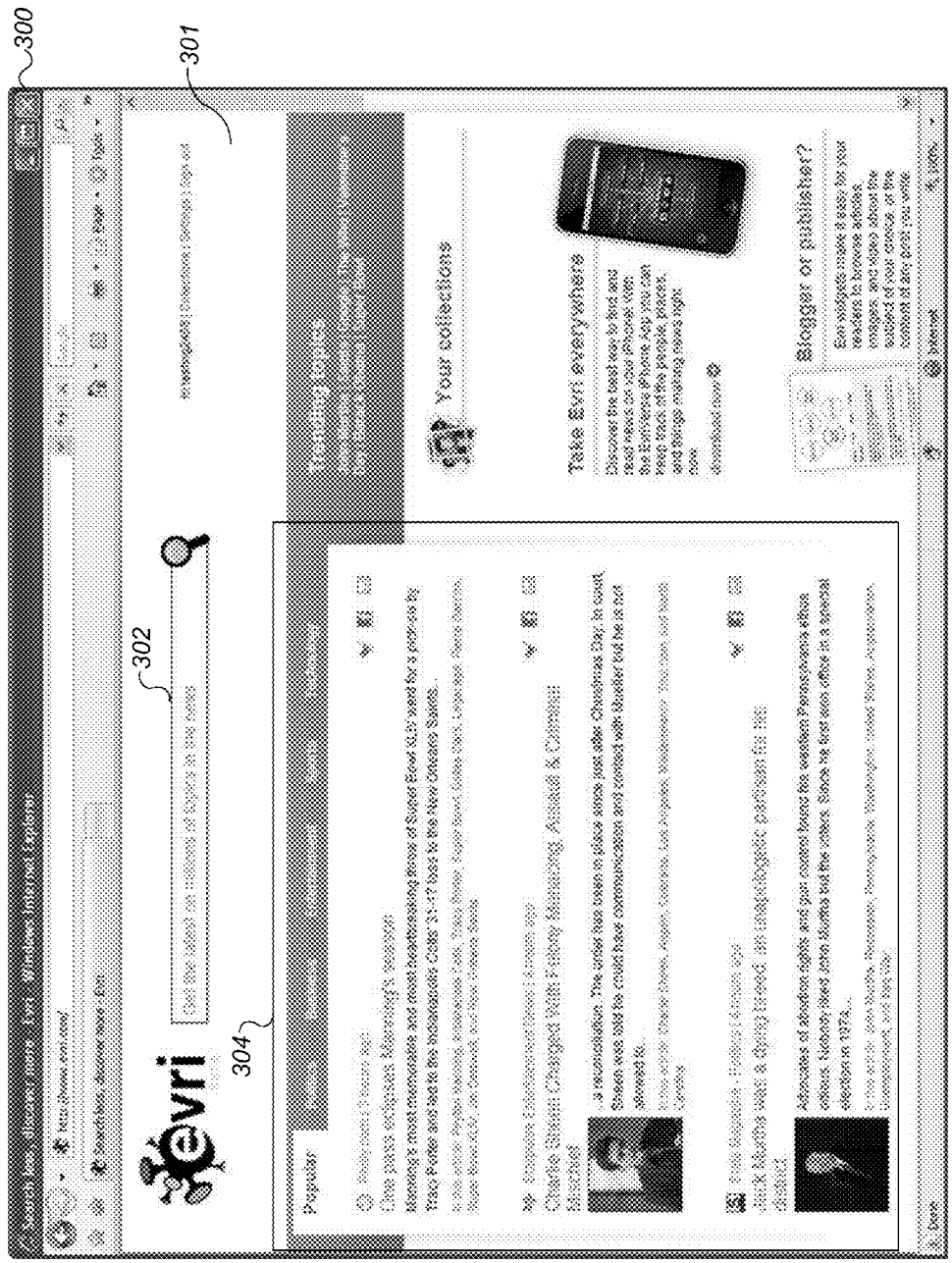

FIG. 3A shows an example home page provided by the content recommendation system. In particular, FIG. 3A illustrates a Web browser 300 displaying a screen 301 provided to a user by a content recommendation system. The screen 301 is a home or main page provided by the content recommendation system, such as may be provided to the user when he or she first accesses the content recommendation system. Various examples of different user interfaces for accessing a content recommendation system are described in detail in U.S. patent application Ser. No. 12/288,349, filed Oct. 16, 2008, and entitled "NLP-BASED CONTENT RECOMMENDER," which is incorporated herein by reference in its entirety. The screen 301 includes a search tool 302 and an articles area 304. As will be described further below, the user can use the search tool 302 to initiate searches for information about content (e.g., articles, entities) known to the content recommendation system. The articles area 304 provides information about articles known to the content recommendation system, possibly arranged by categories, such as popular, politics, business, entertainment, sports, technology, and the like.

Figure 3B:
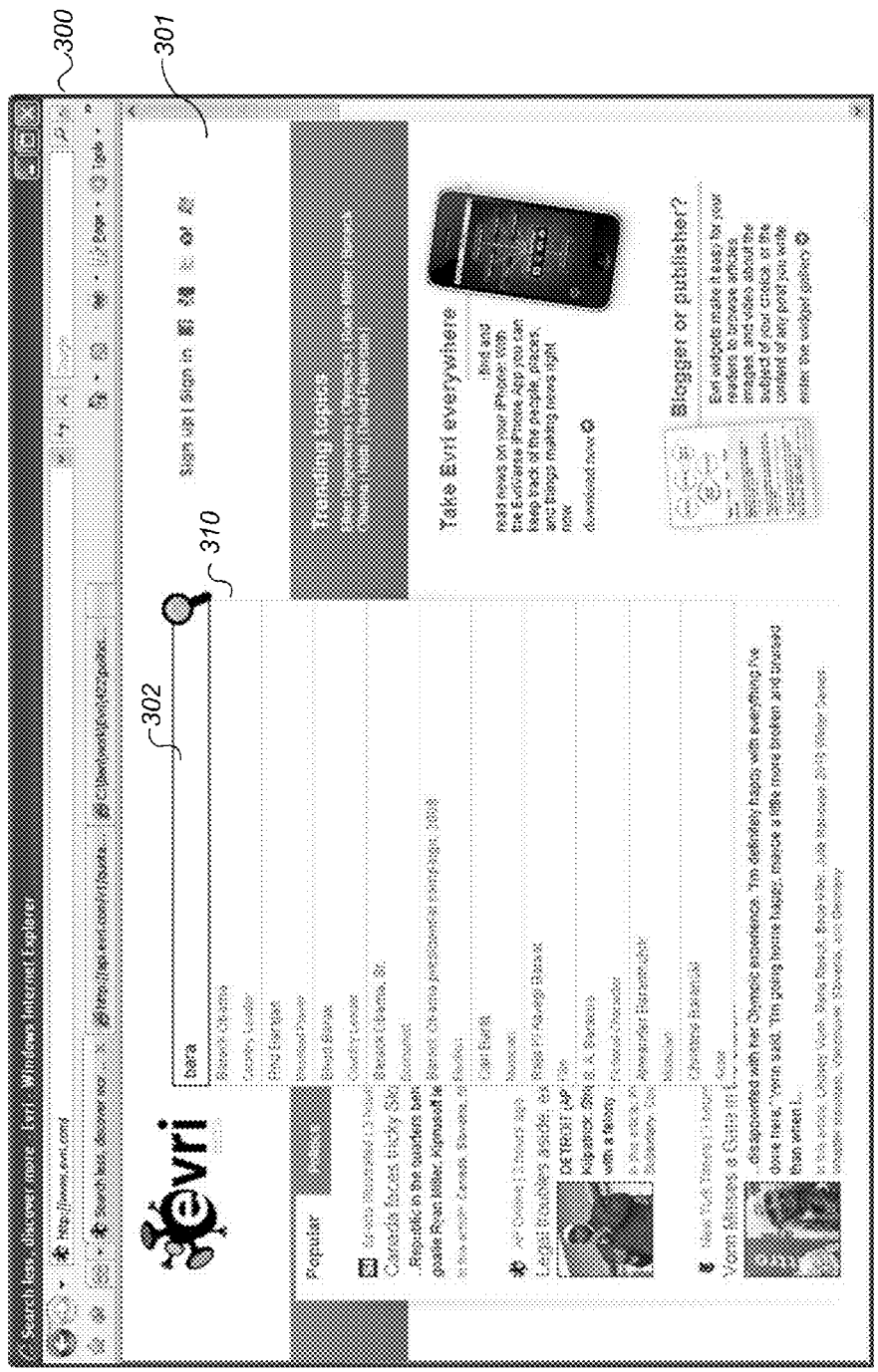

FIG. 3B illustrates initiation of a search via the content recommendation system. In particular, FIG. 3B shows the Web browser 300 displaying screen 301 during the initiation of a search by the user. As the user enters text into the search tool 302, a drop down menu 310 is generated and displayed. The drop down menu 310 displays multiple indications of entities that match a string (e.g., "bara") entered by the user, such that the user can select one of the entities as the subject of the search. In the present example, the user is selecting an entity named "Barack Obama."

Figure 3C:
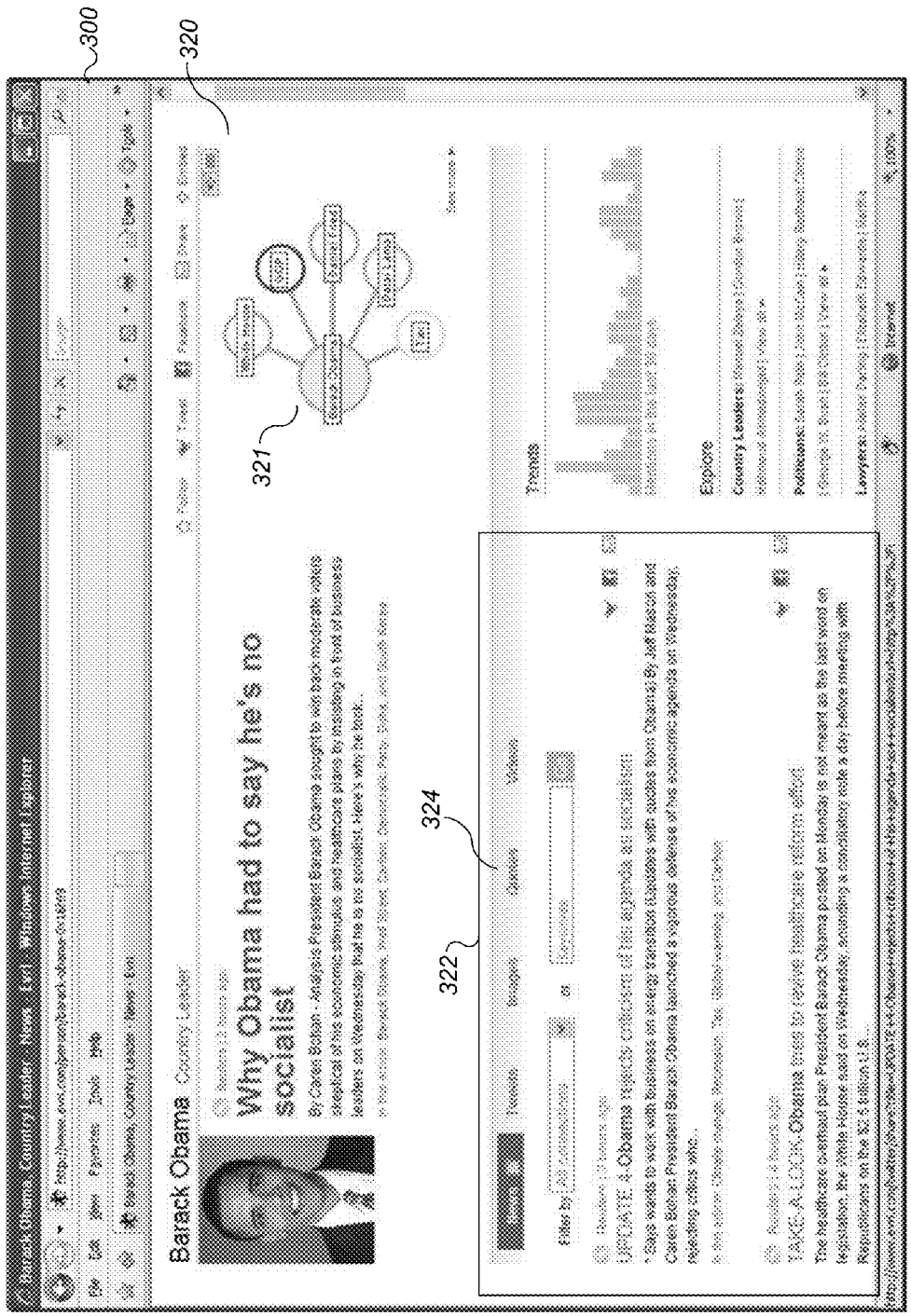

FIG. 3C shows an entity information page provided as a result of the search initiated in FIG. 3B. In particular, FIG. 3C illustrates the Web browser 300 displaying a screen 320 provided in response to a search for the entity named "Barack Obama." The screen 320 is an entity information page that includes an entity relationship graph 321, a related content area 322, and a related quotes control 324 (labeled "Quotes"). The relationship graph 321 graphically presents relationships between Barack Obama and one or more other entities known to the CRS. The related content area 322 displays indications of articles and other content that reference Barack Obama. The related content area is organized by different content types, including articles, tweets, images, quotes, and videos. By selecting the related quotes control 324, the user can obtain quotes by and/or about the current entity (e.g., Barack Obama), as described with reference to FIG. 3D.

Figure 3D:
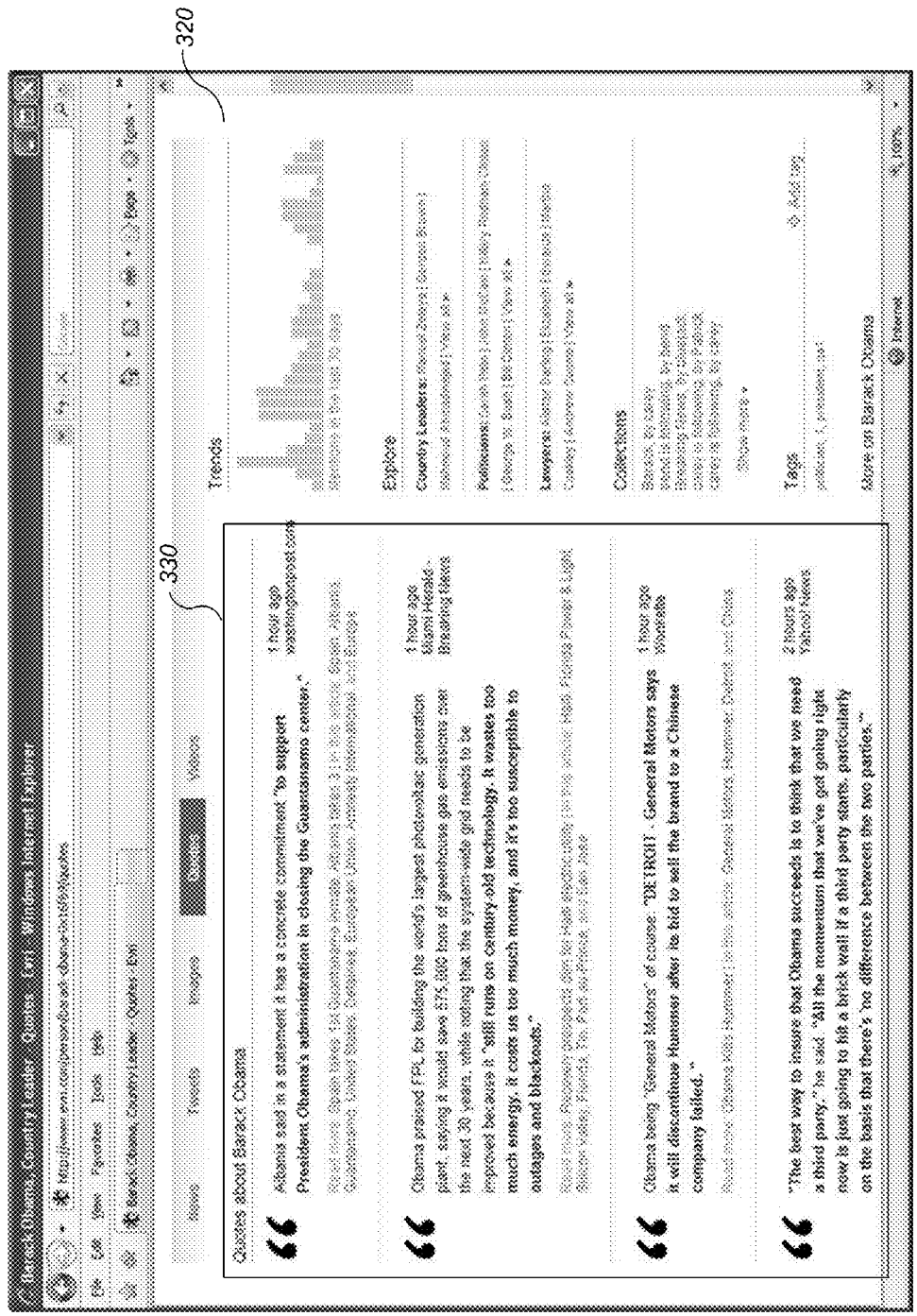

FIG. 3D depicts quotes about a specified entity. In particular, FIG. 3D illustrates screen 320 presenting a quotes area 330 displayed in response to selection of the related quotes control 324 of FIG. 3C. The quotes area 330 includes multiple quotation records that each provide information about a quotation about a particular entity, in this case, Barack Obama. Each quotation record includes various types of information about or related to the quotation, including quotation text, quotation source, article context information (e.g., other entities referenced in the article), and the like.

Figure 3E:
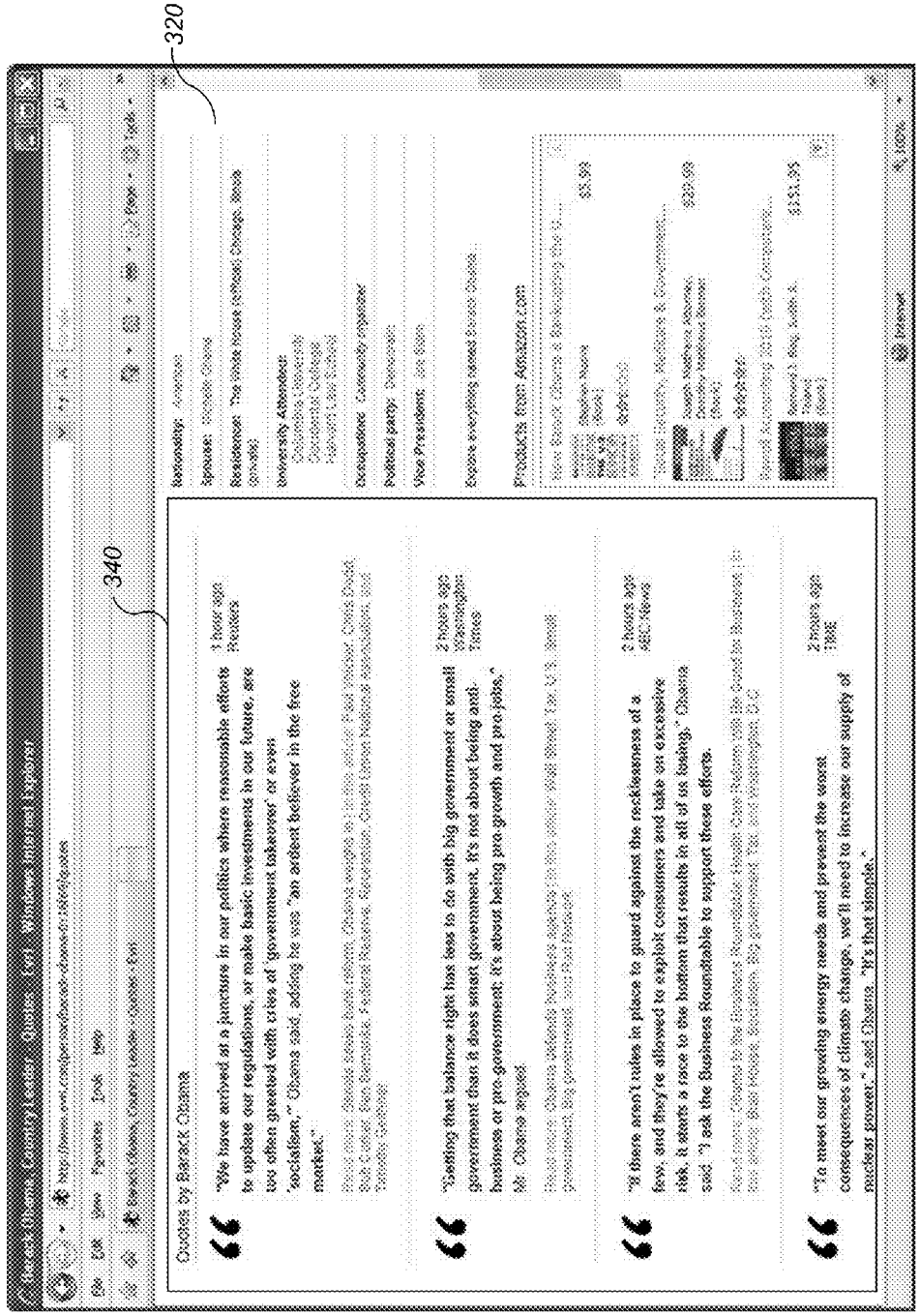

FIG. 3E depicts quotes by a specified entity. In particular, FIG. 3E illustrates screen 320 presenting a quotes area 340 displayed in response to selection of the related quotes control 324 of FIG. 3C. The quotes area 340 is similar to the quotes area 330 described with reference to FIG. 3D, except that the quotes area 340 presents quotations by (rather than about) a particular entity, in this case, Barack Obama.

Figure 3F:
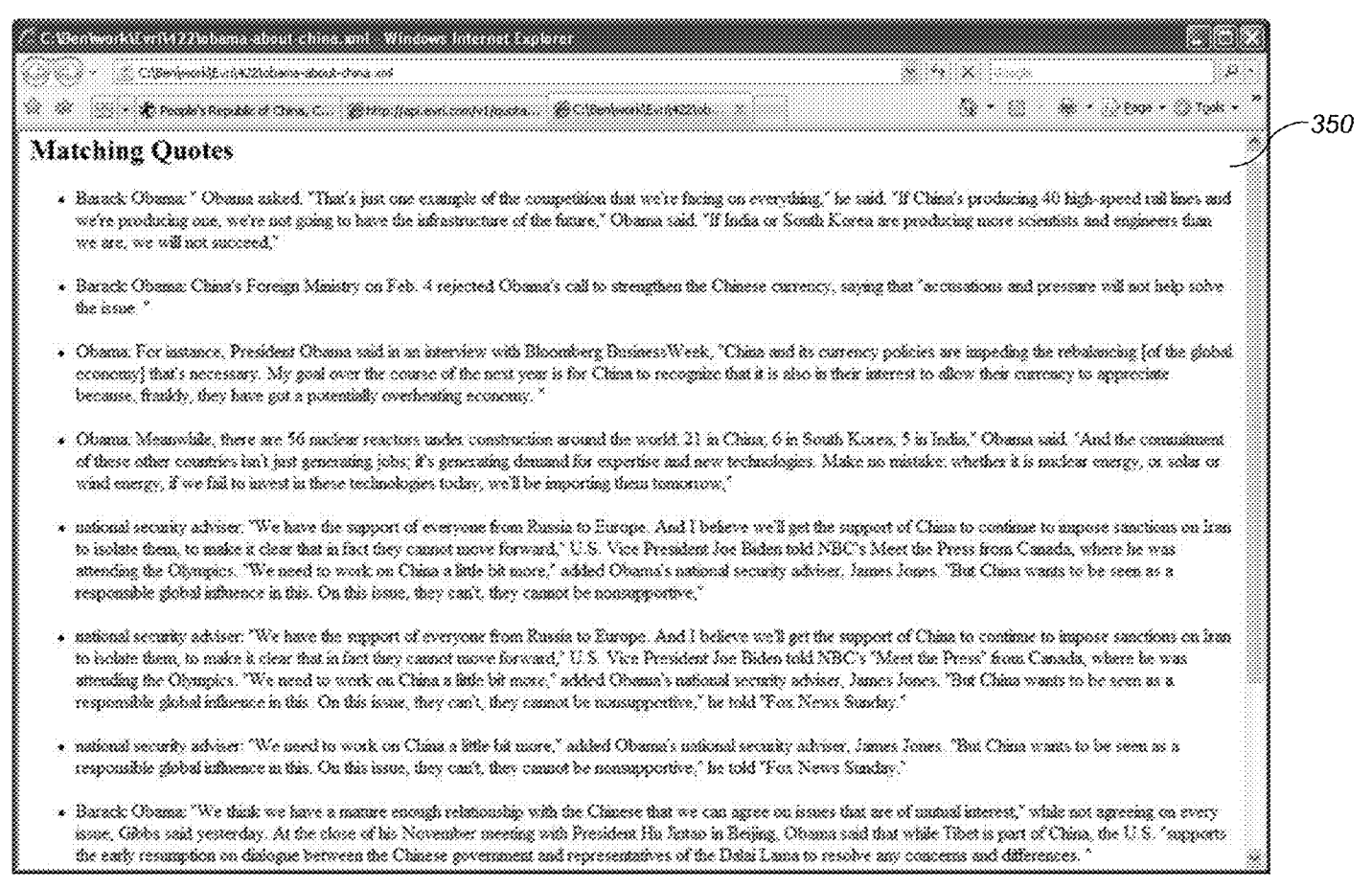

FIG. 3F depicts quotes made by a specified entity about a specified topic entity. In particular, FIG. 3F illustrates a screen 350 presenting quotes by Barack Obama about China. As noted, some embodiments provide an expressive search language that can be utilized to specify quotation searches beyond those simply by or about a particular entity. As illustrated here, the content recommendation system has located quotes by a particular entity and about a particular topic.

Figure 3G:
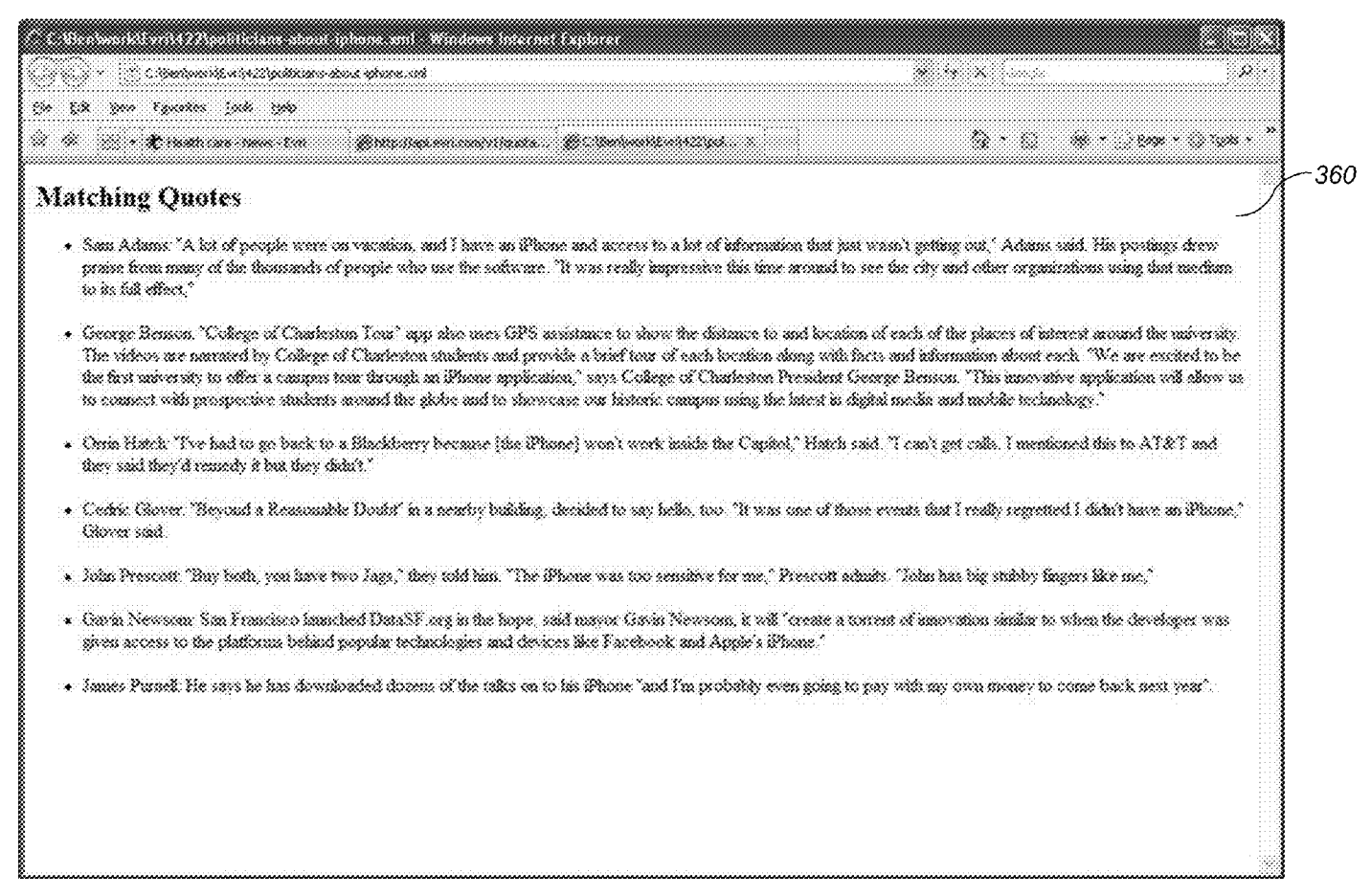

FIG. 3G depicts quotes about a specified topic entity made by entities having a specified facet. In particular, FIG. 3G illustrates a screen 360 presenting quotes by politicians about the iPhone smart phone. Here, the content recommendation system has located quotes by a particular class, type, or group of entity (e.g., specified here by the politician facet) and about a particular topic (e.g., specified here by an indicator of the iPhone entity).

Figure 3H:
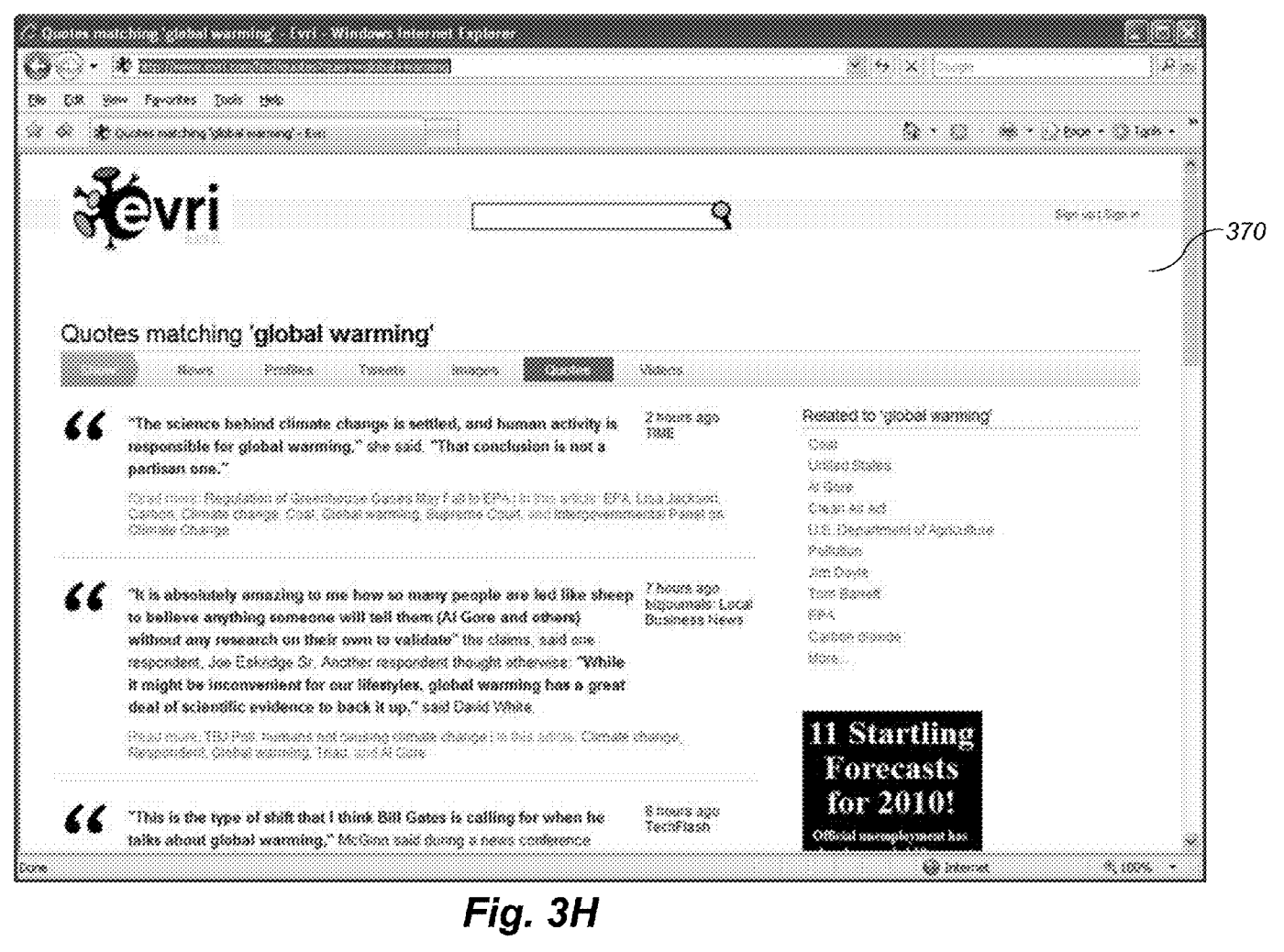

FIG. 3H depicts quotes that include specified keyterms. In particular, FIG. 3H illustrates a screen 370 presenting quotes that include the keyterm "global warming."

The various search techniques discussed above can be combined in various ways in other embodiments. For example, searches can be made for quotes by entities having a specified facet and that include one or more specified keyterms (e.g., quotes by politicians and containing the keyterms "global warming"). Or searches can be made for quotes made by specified entities about entities having a specified facet and including one or more specified keyterms (e.g., quotes by comedians about politicians and containing the keyterms "global warming"). A search language syntax provided and implemented by a specific example embodiment is described with reference to the section entitled "Quotation Recommendation Details in an Example Embodiment," below.

Figure 4A:
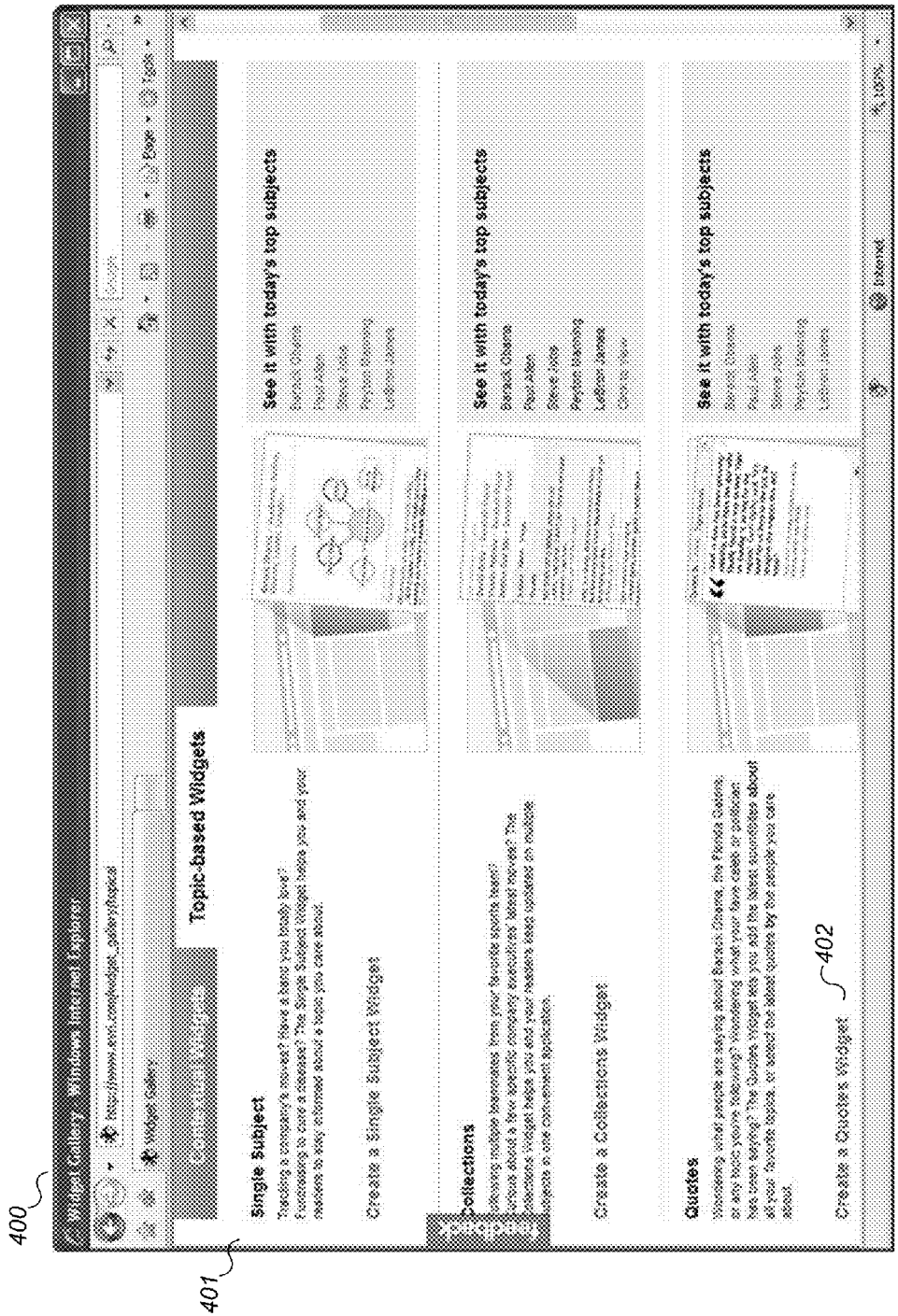
Figure 4B:
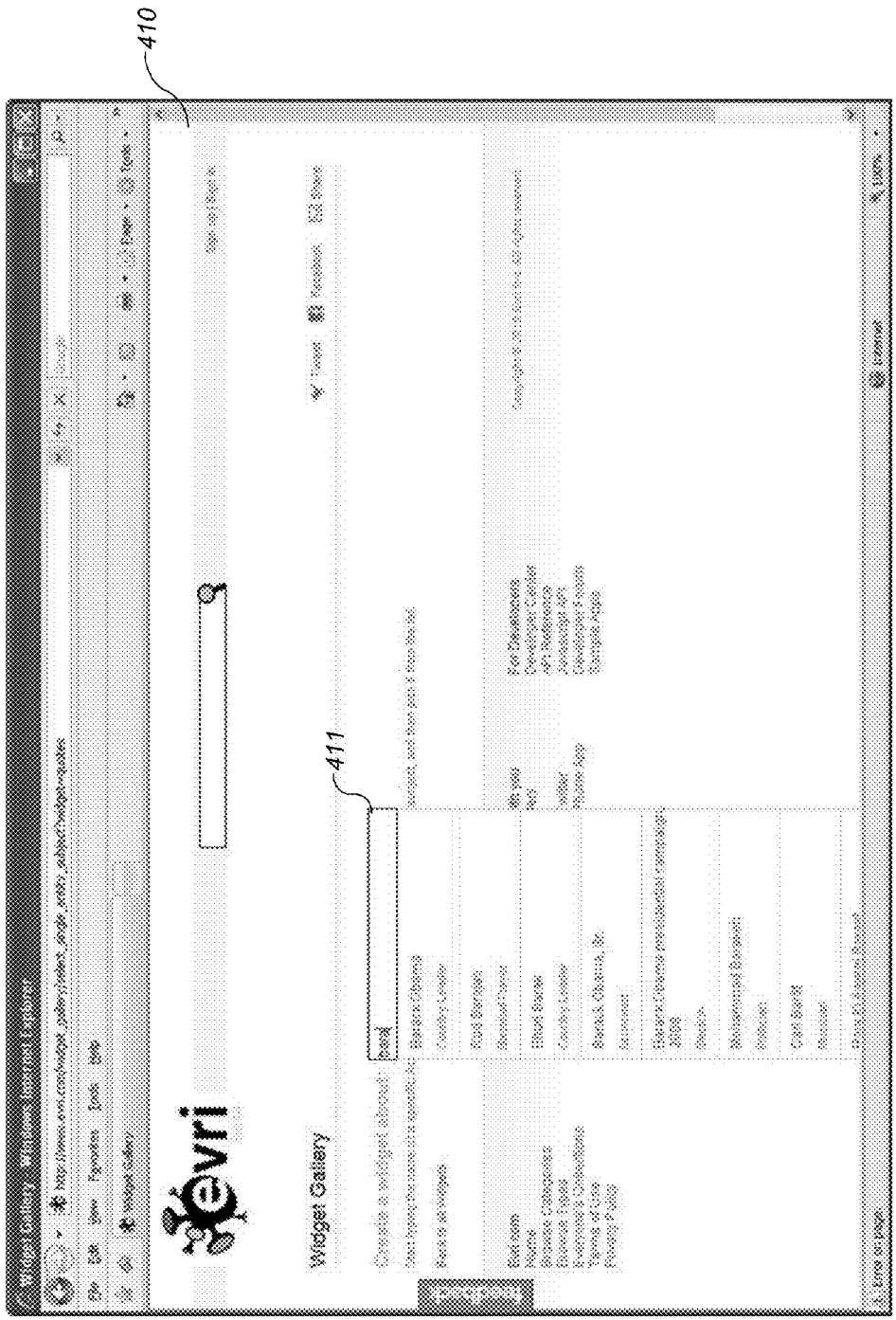
Figure 4C:
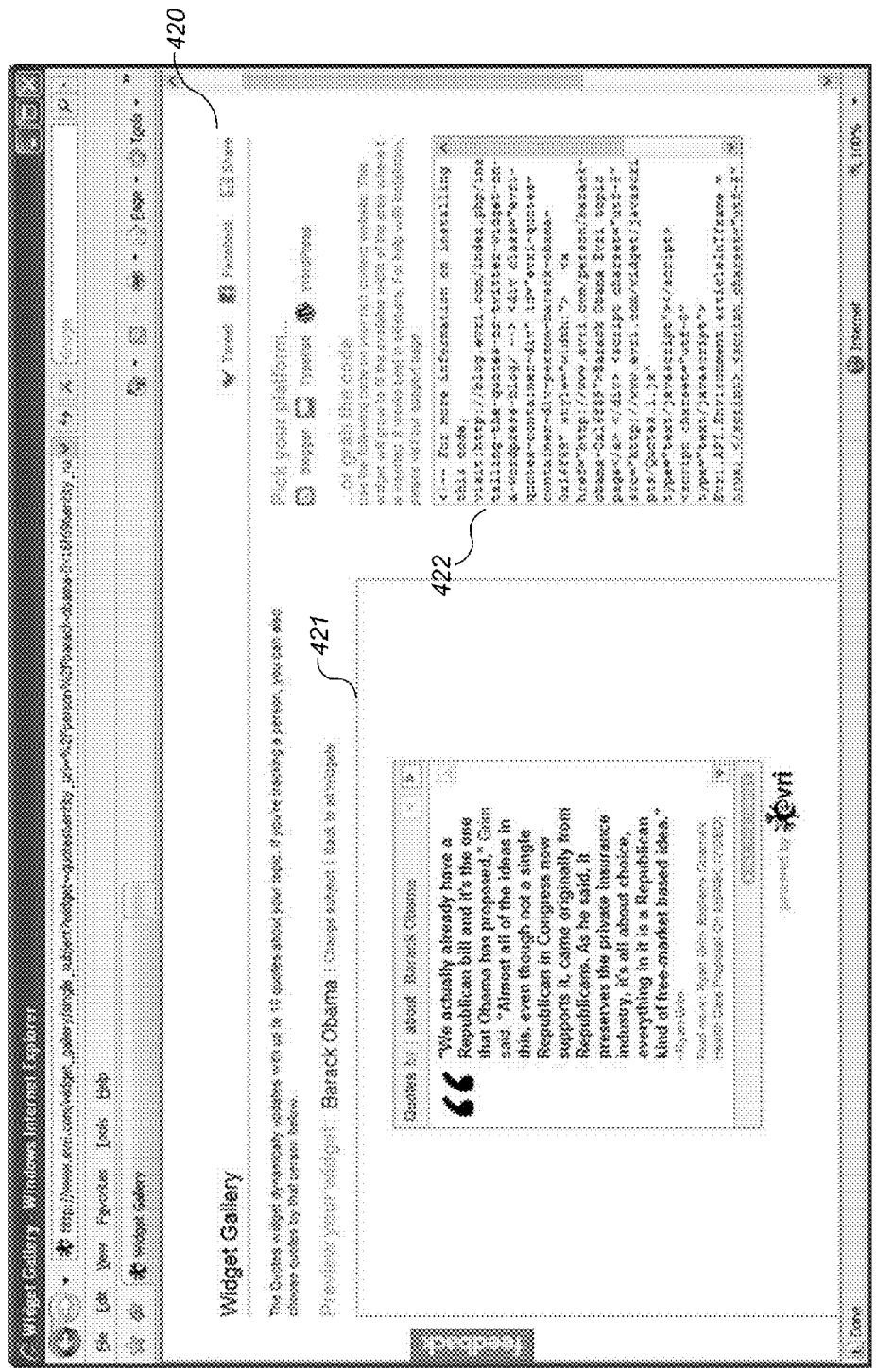
Figure 4D:
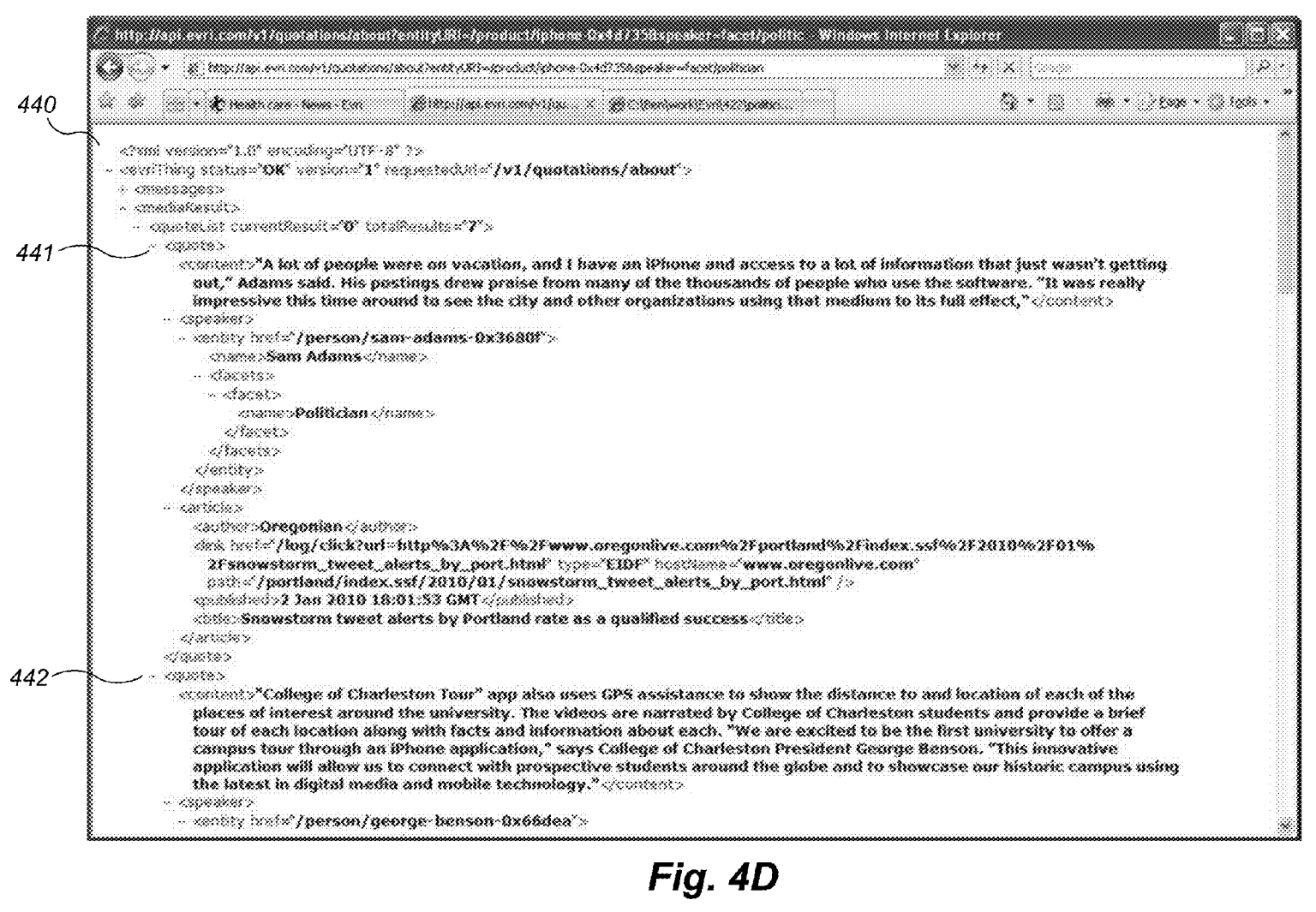

FIGS. 4A-4D illustrate additional example screen displays provided by an example embodiment of a content recommendation system. More specifically, FIGS. 4A-4C depict various user interface techniques for creating quotations widgets, and FIG. 4D depicts quotation information provided in XML format by one example embodiment.

FIG. 4A shows a widget gallery provided by a content recommendation system. In particular, FIG. 4A illustrates a Web browser 400 displaying a screen 401 provided to a user by the content recommendation system. The screen 401 is a widget gallery provided by the content recommendation system. Screen 401 includes a control (e.g., a link) 402 that can be selected by a user to create a quotations widget. A quotations widget is a code module that can be included in an application (e.g., a third-party application or some other software system) and that is configured to provide quotations by or about specified entities.

FIG. 4B illustrates the creation of a quotations widget. In particular, FIG. 4B illustrates a screen 410 displayed in response to a user selection of control 402 of FIG. 4A. The screen 410 includes a quotations widget creation tool 411 that includes a search tool and drop down menu that can be selected by the user to specify an entity that is the speaker or subject of a generated quotations widget. In the present example, the user is creating a quotations widget for the entity Barack Obama. In other embodiments, additional user interface controls may be included, such that the user can specify a more fine-grained search for quotations. For example, one embodiment provides additional controls such as a speaker field, a subject field, one or more date fields (e.g., to specify a date range), a keyword field, and the like.

FIG. 4C shows a quotations widget preview. In particular, FIG. 4C illustrates a screen 420 that is a quotations widget preview page displayed in response to the creation of a quotations widget as described with reference to FIG. 4B. The screen 420 includes a widget preview area 421 and a widget code area 422. The preview area 421 displays a preview of the created widget, as it would appear if it were embedded in a third-party application, such as a Web page, blog, or the like. The code area 422 provides instructions (e.g., JavaScript code) that can be copied by a user into some other application. The provided instructions are configured, when executed, to display the quotations widget previewed in the preview area 421.

FIG. 4D shows example quotation information represented in an XML format. In particular FIG. 4D illustrates a screen 440 that presents an XML structure (e.g., a tree) that includes multiple quotation sections, such as sections 441 and 442, that each represent information about a quotation. The illustrated XML structure may be provided in response to, for example, a search request such as those described with reference to FIGS. 3D-3H, above. The quotation sections 441 and 442 each include various types of information about a quotation, such as a content section that includes the text of the quotation, a speaker section that describes the speaker of the quotation, an source information section (e.g., describing article author, title, publication date), and the like.

Although the user interface techniques of FIGS. 3A-3H and 4A-4D have been described primarily with reference to Web-based technologies, the described techniques are equally applicable in other contexts. For example, a quotations widget may be implemented as one or more code objects (e.g., a Java object) that can be embedded within a client-side desktop, personal productivity device, tablet computer, or mobile device, and configured to interact with the content recommendation system to obtain and display quotations provided by the content recommendation system.

Figure 5:
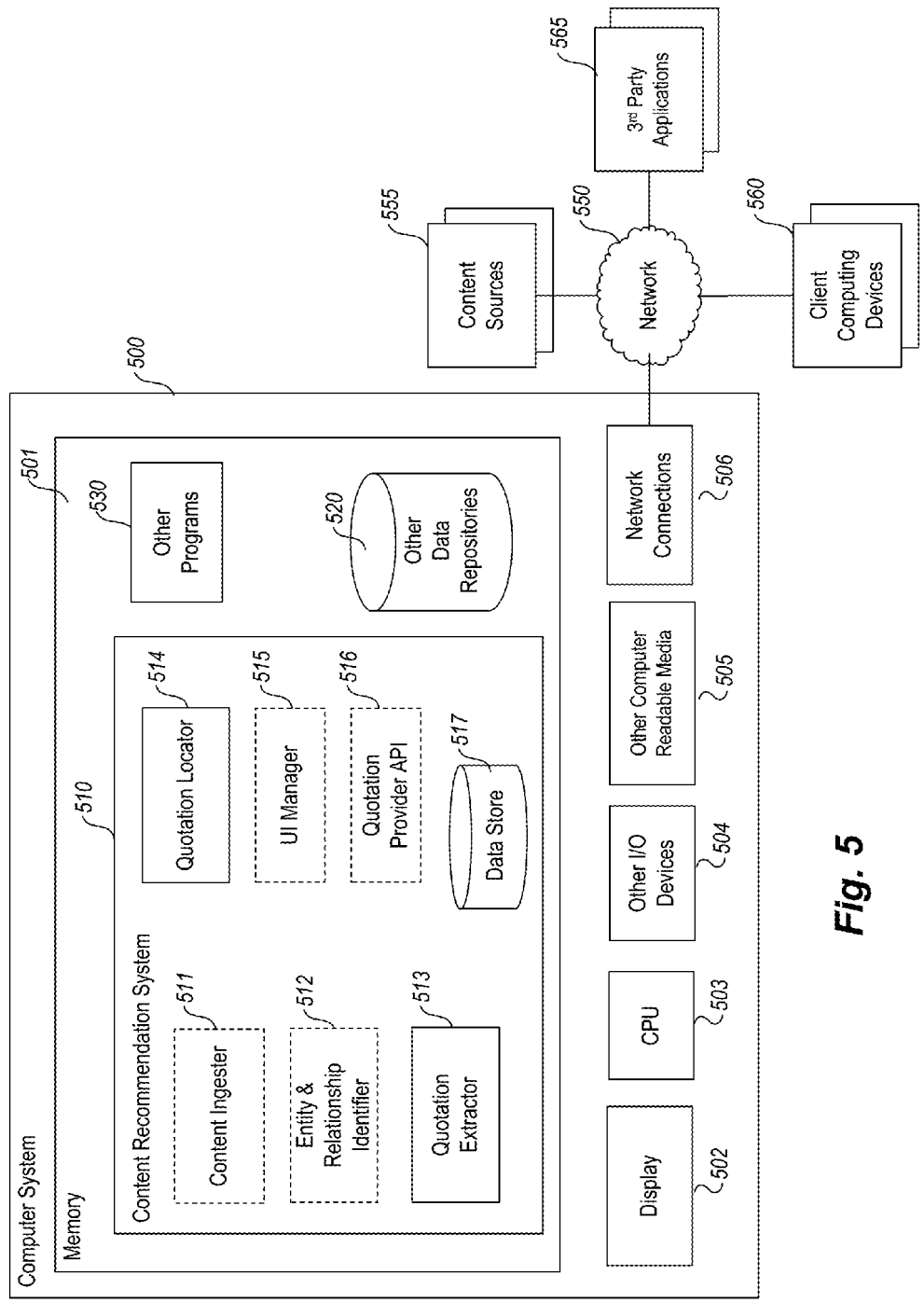
FIG. 5 is an example block diagram of an example computing system for implementing a content recommendation system according to an example embodiment.

FIG. 5 is an example block diagram of an example computing system for implementing a content recommendation system according to an example embodiment. In particular, FIG. 5 shows a computing system 500 that may be utilized to implement a content recommendation system 510.

Note that one or more general purpose or special purpose computing systems/devices may be used to implement the content recommendation system 510. In addition, the computing system 500 may comprise one or more distinct computing systems/devices and may span distributed locations. Furthermore, each block shown may represent one or more such blocks as appropriate to a specific embodiment or may be combined with other blocks. Also, the content recommendation system 510 may be implemented in software, hardware, firmware, or in some combination to achieve the capabilities described herein.

In the embodiment shown, computing system 500 comprises a computer memory ("memory") 501, a display 502, one or more Central Processing Units ("CPU") 504, Input/Output devices 504 (e.g., keyboard, mouse, CRT or LCD display, and the like), other computer-readable media 505, and network connections 506. The content recommendation system 510 is shown residing in memory 501. In other embodiments, some portion of the contents, some or all of the components of the content recommendation system 510 may be stored on and/or transmitted over the other computer-readable media 505. The components of the content recommendation system 510 preferably execute on one or more CPUs 503 and extract and provide quotations, as described herein. Other code or programs 530 (e.g., an administrative interface, a Web server, and the like) and potentially other data repositories, such as data repository 520, also reside in the memory 501, and preferably execute on one or more CPUs 503. Of note, one or more of the components in FIG. 5 may not be present in any specific implementation. For example, some embodiments may not provide other computer readable media 505 or a display 502.

In a typical embodiment, the content recommendation system 510 includes a content ingester 511, an entity and relationship identifier 512, a quotation extractor 513, a quotation locator 514, a user interface manager 515, a quotation provider application program interface ("API") 516, and a data store 517. The content ingester 511, entity and relationship identifier 512, user interface manager 515, and recommender API 516 are drawn in dashed lines to emphasize that in other embodiments, functions performed by one or more of these components may be performed externally to the content recommendation system 510. In other embodiments, the content recommendation system 510 includes other content recommendation modules that are configured to provide other types of content, such as article or entity recommendations based on user searches, user preferences, entity collections, and the like.

The content ingester 511 performs functions such as those described with reference to the content ingester 211 of FIG. 2. The ingester 511 obtains content items, such as Web pages, Blog postings, videos, audio files, and the like from various content sources 555 via network 550, and stores information about the obtained content items in the data store 517, for use by other components, such as the entity and relationship identifier 512, the quotation extractor 513, and/or the quotation locator 514.

The entity and relationship identifier 512 performs functions such as those described with reference to the entity and relationship identifier 212 of FIG. 2. The identifier 512 processes the information about content items stored in the data store 517 in order to identify entities and relationships between them. Identified entities and relationships are stored in the data store 517, for use by other components, such as the quotation extractor 513 and/or the quotation locator 514.

The UI manager 515 provides a view and a controller that facilitate user interaction with the content recommendation system 510 and its various components. For example, the UI manager 515 may provide interactive access to the content recommendation system 510, such that users can obtain quotations, generate quotations widgets, and the like. In some embodiments, access to the functionality of the UI manager 515 may be provided via a Web server, possibly executing as one of the other programs 530. In such embodiments, a user operating a Web browser executing on one of the client devices 560 can interact with the content recommendation system 510 via the UI manager 515.

The quotation extractor 513 performs functions such as those described with reference to the quotation extractor 213 of FIG. 2. The extractor 513 extracts quotations based on information about content items stored in the data store 517 by the ingester 511 and identifier 512. The extracted quotations are stored in the data store 517 for use by other components, such as the quotation locator 514, UI manager 515, and the like.

The quotation locator 514 performs functions such as those described with reference to the quotation locator 214 of FIG. 2. The quotation locator 514 receives, possibly via the UI manager 515, a request including a search query specifying one or more entities by or about which quotations are desired. In response, the quotation locator 514 searches the data store 517 to determine one or more quotations that match the received query. The determined quotations can be cached (e.g., stored in the data store 517) for later use and/or provided directly in response to a received request, such as may be generated by the UI manager 515.

In one embodiment, the quotation locator 514 operates synchronously in an on-demand manner, in that it performs its functions in response to a received request, such as in response to a user interface event processed by the UI manager 515. In another embodiment, the quotation locator 514 operates asynchronously, in that it automatically determines quotations for one or more queries. For example, the quotation locator 514 may automatically execute from time to time (e.g., once per hour, once per day) in order to generate bulk quotation information for commonly requested (or recently used) queries. The quotation locator 514 may execute upon the occurrence of other types of conditions, such as when new quotations are extracted and/or stored, and the like.

The API 516 provides programmatic access to one or more functions of the content recommendation system 510. For example, the API 516 may provide a programmatic interface to one or more functions of the content recommendation system 510 that may be invoked by one of the other programs 530 or some other module. In this manner, the API 516 facilitates the development of third-party software, such as user interfaces, plug-ins, widgets, news feeds, adapters (e.g., for integrating functions of the content recommendation system 510 into Web applications), and the like. In addition, the API 516 may be in at least some embodiments invoked or otherwise accessed via remote entities, such as one of the third-party applications 565, to access various functions of the content recommendation system 510. For example, a third-party application may request quotations from the content recommendation system 510 via the API 516. The API 516 may also be configured to provide quotations widgets (e.g., code modules) that can be integrated into third-party applications and that are configured to interact with the content recommendation system 510 to make at least some of the described functionality available within the context of other applications. The section entitled "Example Quotation Recommendation API," below, describes an example API provided by one specific embodiment of an example CRS.

The data store 517 is used by the other modules of the content recommendation system 510 to store and/or communicate information. As discussed above, components 511-516 use the data store 517 to record various types of information, including content, information about stored content including entities and relationships, information about quotations, user information, and the like. Although the components 511-516 are described as communicating primarily through the data store 517, other communication mechanisms are contemplated, including message passing, function calls, pipes, sockets, shared memory, and the like.

The content recommendation system 510 interacts via the network 550 with content sources 555, third-party applications 565, and client computing devices 560. The network 550 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The client computing devices 560 include desktop computing systems, notebook computers, mobile phones, smart phones, personal digital assistants, tablet computers, and the like.

Other or additional functions and/or data are contemplated. For example, in some embodiments, the content recommendation system 510 includes additional content recommendation components that are specialized to other types of content, such as for video, quotations, images, audio, advertisements, product information, and the like.

In an example embodiment, components/modules of the content recommendation system 510 are implemented using standard programming techniques. For example, the content recommendation system 510 may be implemented as a "native" executable running on the CPU 503, along with one or more static or dynamic libraries. In other embodiments, the content recommendation system 510 may be implemented as instructions processed by a virtual machine that executes as one of the other programs 530. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the content recommendation system 510, such as in the data store 517, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 517 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the content recommendation system 510 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and/or data structures may be stored as non-transitory content on one or more tangible computer-readable mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 6:
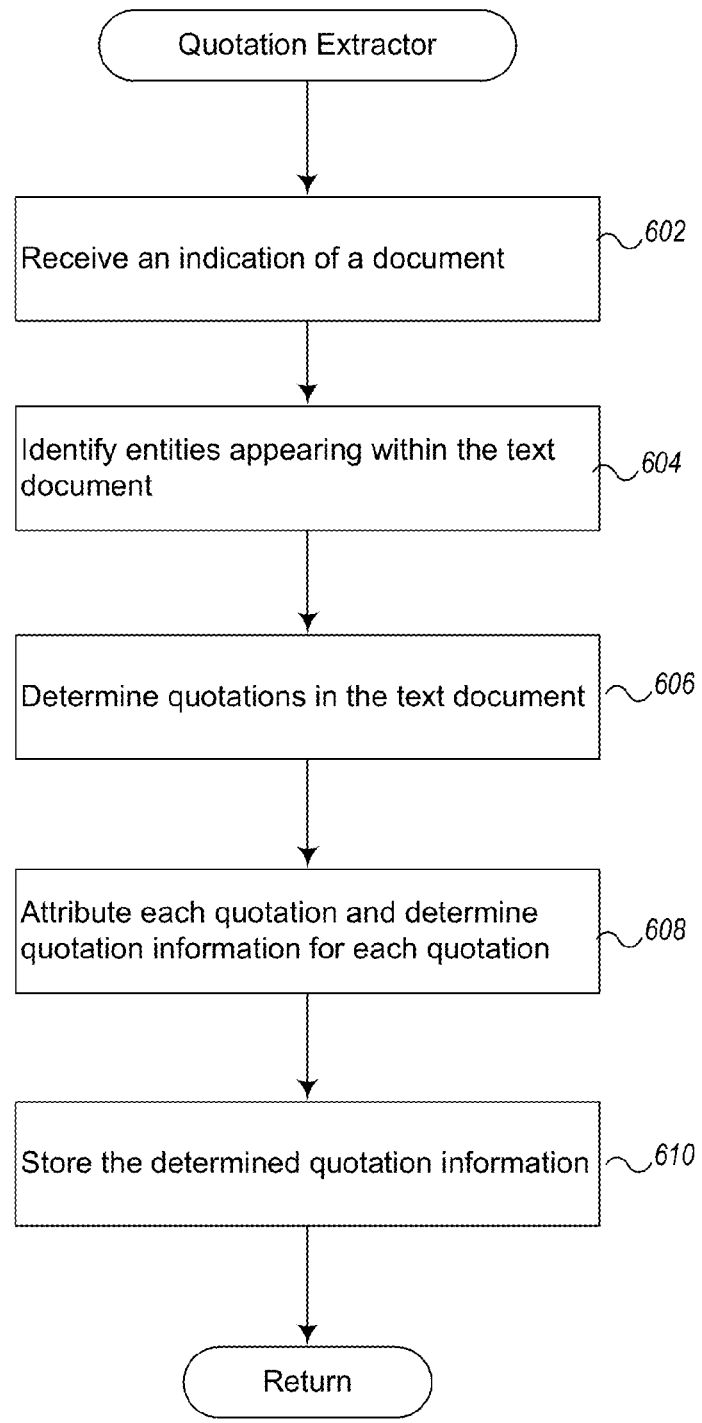
FIG. 6 is an example flow diagram of a quotation extractor process performed by a content recommendation system according to an example embodiment.

FIG. 6 is an example flow diagram of quotation extractor process performed by a content recommendation system according to an example embodiment. In particular, FIG. 6 illustrates a process that may be implemented by, for example, one or more elements of the content recommendation system 200, such as the quotation extractor 213, as described with reference to FIG. 2. The process extracts quotations from a document or other text source.

The illustrated process begins at block 602, where it receives an indication of a document. Receiving an indication of a document may include receiving a document reference (e.g., a file name, a uniform resource identifier, a database identifier). The received document reference may identify an original source document, such as may be found on a remote Web server or other document source, such as one of the content sources 255 described with reference to FIG. 2. In other embodiments, the received document reference may instead identify document information generated about a document by some other component of the content recommendation system, such as may be stored in the document store 217a described with reference to FIG. 2.

At block 604, the process identifies entities appearing within the text document, such as using an NLP-based recognition and disambiguation process, for use in attributing any quotations found within the text document. Identifying entities may include performing linguistic and/or semantic analysis of the document. Linguistic and semantic analysis may include such operations as sentence/paragraph detection, parts-of-speech and/or grammatical role tagging, phrase or clause detection, and the like. Identifying entities may also include linking references to the same entity across the document, including by resolving pronoun co-references, aliases and abbreviations, and definite-noun anaphora, and the like. Identifying entities may include other operations, such as entity disambiguation, facet assignment, and the like.

At block 606, the process determines whether there are quotations within the text document. One way the CRS detects quotations is by determining whether one of a predetermined verb likely to indicate a quotation is present within the text and whether quotation marks are present in the text. The presence of both will indicate a more likely chance that a quotation is present within the document. Thus, determining quotations includes detecting quotations by extracting one or more sentences of a potential quotation based on detected quotation verbs (e.g., say, comment, suggest) and/or quotation punctuation (e.g., double or single quotation marks).

At block 608, the process attributes the quotation (e.g., by determining the speaker entity of the quotation) using, for example, the identified entities in block 604 and determines additional quotation information, for example determining the quotation verb; determining the quotation text; and determining other entities, facets, and/or keywords referenced in the quotation.

At block 610, the process stores (or otherwise indexes) the determined quotation information. Storing the determined quotation information may include, for each quotation detected at block 606, indexing a subject-action-object triple, where the subject field identifies the speaker entity of the quotation, the action field identifies the quotation verb, and the object field stores the quotation text. Other information may be indexed, including various modifiers (e.g., subject or verb modifiers), other entity information (e.g., entities and/or facets referenced by the quotation), time and date information, source information, and the like.

After block 610, the process returns.

Some embodiments perform one or more operations/aspects in addition to, or instead of, the ones described with reference to the process of FIG. 6. For example, in one embodiment, the process includes a loop that repeatedly receives and processes documents, so as to perform bulk quotation extraction upon a batch (e.g., corpus) of documents. In another embodiment, the process of FIG. 6 is invoked in an on-demand manner in response to a received user interface request. Techniques for quotation extraction used in a specific example embodiment are described with reference to the section entitled "Quotation Recommendation Details in an Example Embodiment," below.

Figure 7:
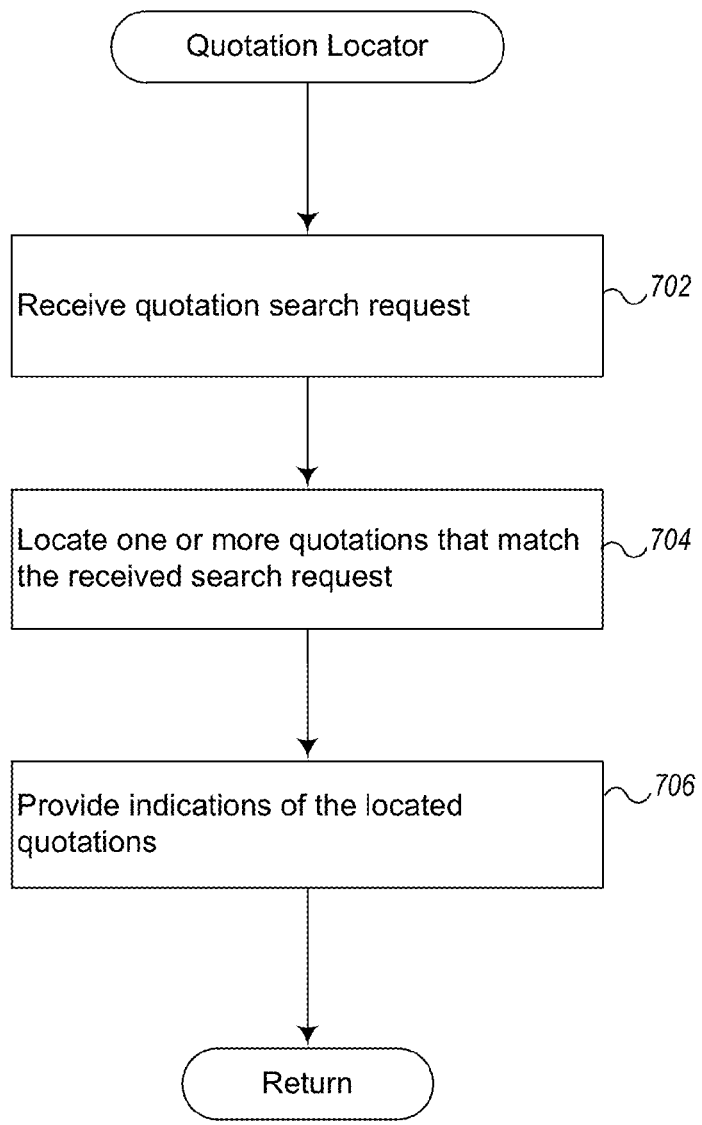
FIG. 7 is an example flow diagram of a quotation locator process performed by a content recommendation system according to an example embodiment.

FIG. 7 is an example flow diagram of a quotation locator process performed by a content recommendation system according to an example embodiment. In particular, FIG. 7 illustrates a process that may be implemented by, for example, one or more elements of the content recommendation system 200, such as the quotation locator 214, as described with reference to FIG. 2. The process provides quotations that match received search requests.

The illustrated process begins at block 702, where it receives a quotation search request. The quotation search request may be received from various sources, such as from an interactive user interface being operated by a user and/or a quotations widget or other code module configured to automatically request quotations.

Typically, the quotation search request specifies one or more features that are to be present in any quotation that matches the request. For example, the request may specify one or more quotation speakers (e.g., by indicating an entity or a facet), one or more quotation subjects (e.g., by indicating entities, facets, and/or keywords), and the like. In some embodiments, the specified features can be combined or modified, such as via Boolean operators (e.g., AND, OR, NOT).

At block 704, the process locates one or more quotations that match the received search request. Locating matching quotations may include searching an index or other representation of quotation information, to determine one or more quotations that match or approximately match one or more features of the quotation search request. In one embodiment, locating matching quotations includes searching the quotations store 2176 based upon NLP-based search techniques as described with reference to FIG. 2.

At block 706, the process provides indications of the located quotations. Providing indications of the located quotations may include presenting, or transmitting for presentation, various information about the located quotations, such as quotation text, quotation attribution (e.g., speaker), context (e.g., text surrounding the quotation), and the like. Providing quotations may also include ranking or ordering the located quotations based on one or more factors, such as publication date, source credibility, and number of duplicate quotations.

Some embodiments perform one or more operations/aspects in addition to, or instead of, the ones described with reference to the process of FIG. 7. For example, some embodiments aggregate located quotations by identifying groups of identical or similar quotations, and then providing only a single quotation for each identified group of quotations. Techniques for quotation location and presentation used in a specific example embodiment are described with reference to the section entitled "Quotation Recommendation Details in an Example Embodiment," below.

In the following, additional example techniques for extracting and providing quotations are discussed.

Quotation Recommendation Details in an Example Embodiment

The following describes an approach to quotation extraction and search used by one example embodiment.

Overview

In this example embodiment, the quotation extraction and search subsystem of the content recommendation system ("CRS") has three components:

1. Quotation extraction and attribution from text documents
2. Indexing of the extracted quotations and attributions in an efficient inverted
index
3. Search of the indexed quotations

EXAMPLES

On any entity profile page, if the entity is a person, the CRS presents retrieved quotes about the person, followed by quotes made by the person. For example, on the profile page of President Obama:
   http://www.evri.com/persQn/barack-obama-0x18f69/quotes
   Quotes about Barack Obama
   Quotes by Barack Obama If the entity is not a person, the CRS presents quotes about the entity, e.g., quotes about iPhone: http://www.evri.com/product/iphone-0x4d735/quotes quotes about Afghanistan: http://www.evri.com/location/afghanistan-0x31cde/quotes The CRS also surfaces quotes about any keywords or phrases, e.g., http://www.evri.com/find/quotes?Query=global+warming returns quotes about phrase "global warming"

Evri Public APIs:

In addition, the CRS exposes quotation search capability via a set of public APIs (see http://www.evri.com/developer/rest#API-GetQuotations).

Quotes Public API examples:

quotes by a person, e.g., http://api.evri.com/v1/quotationsspeaker=/Derson/barack-obama-0x18f69 quotes about an entity, e.g., http://api.evri.com/v1/quotations/aboutentitvURI=/product/iphone-0x4d735 quotes by any entities of certain facet, e.g., quotes made by football players http://api.evri.com/v1/quotations?speaker-facet/football_player quotes about any entities of certain facet, e.g., quotes about college football teams http://api.evri.com/v1/quotations/about?facet-college_football_team quotes about any keyword or phrase, e.g., http://api.evri.com/v1/quotations/about?phrase=hoyas quotes made by a person about any entities of a particular facet, e.g., quotes made by David Letterman about any politicians, http://api.evri.com/v1/quotations/about?facet=politician&speaker=/person/david-letterman-0x1b480 quotes made by any entities of a particular facet about something, e.g., quotes made by any football players about super bowl, http://api.evri.com/v1/quotations/about?phrase=super%20bowl&speaker=facet/football_player The "facets" of an entity are typically discoverable from an ontology or taxonomy of entities. A list of example facets appears in the section entitled "Example Facets." Fewer or more facets can be made available, and the set of facets used by the system are generally configurable. The facets may be organized into a hierarchical taxonomy. Therefore, a facet can be represented as a taxonomic path, e.g., [Person/Sports/Athlete/Football_Player]. During search time, the CRS has the flexibility to support query on "Football_Player", or any of its parent nodes in the taxonomic path, e.g., "Athlete" or "Person".

An example API is discussed in more detail below in the section entitled "Example Quotation Recommendation API."

Quotation Extraction and Attribution

I. Linguistic and semantic analysis: Given a text document, the example CRS applies deep linguistic analysis that includes at least some of the following steps:

a) split the document into paragraphs, and paragraphs into sentences b) for each sentence, apply linguistic parsing to extract part-of-speech tags (e.g., nouns, verbs), performing lexical analysis (e.g., detecting phrases), and determining grammatical roles (e.g., subjects, verbs, objects)

c) Apply named entity recognition to identify entities and concepts appearing in the text.

1. Link multiple mentions of the same entity across the document, including resolving pronoun coreference (e.g., "he", "him", "she"), aliases and abbreviations ("Obama", "Gates", "Bill"), and the definite-noun anaphora (e.g., "the president", "the coach"). The coreference resolution may be useful in determining quotation attributions, because very often the speaker's full name is not provided for a given quote. Instead, the writer typically uses pronouns ("he said"), partial names ("said Gates"), or definite nouns ("the president said"). Similarly, in quotations, entities are often mentioned as aliases or pronoun anaphoras. Applying coreference resolution typically helps identify such mentions, that otherwise would be missed by keyword matching techniques.

2. To each entity, the CRS assigns its type and facet categories. For example, the CRS tags the entity "Michael Jackson" with type 'person' and facet as 'musician'.

3. Apply entity disambiguation such that each mention of an entity is linked to an entry in a repository of entities. As a result, different mentions of an entity are all marked with a unique identifier. During search, the CRS supports search of entities by their unique identifiers, instead of using ambiguous keywords. For example, the CRS is able to distinguish between Will Smith the actor and Will Smith the American football player who plays for the New Orleans Saints.

II. Quotation verb detection:

a) For each verb detected in a sentence, the CRS checks if the verb belongs to a pre-determined list of verbs that can be potentially used to indicate a quotation (e.g., acknowledge, argue, caution, say, suggest, urge, etc.)

b) Check the appearance and positions of quotation marks in the sentence c) Determine quotation candidates based on combination of the above two factors, e.g., if there is a quotation verb and there are quotation marks nearby, the CRS has higher confidence there is a quotation contained in the text.

III. Attribution and Collapsing: Collapse each detected quotation into a triple of (speaker, verb, quote)

a) Speaker: the main subject of the verb, as well as its modifier, such as title and affiliation of the speaker (e.g., given "said Microsoft chairman Bill Gates . . . ", the CRS recognizes "Bill Gates" as the speaker, with "Microsoft" and "chairman" as the modifiers)

b) Verb: quotation verb. In addition, the CRS stores the prepositional modifiers of the verb. The modifiers usually provide context of the quote being made (e.g., given "said Bill Gates in the Microsoft shareholder meeting in Seattle", the modifiers are "in Seattle" and "in the Microsoft shareholder meeting")

c) Quote: actual quotes within beginning and ending quotation marks. Note that a quote could span multiple sentences. The CRS searches for starting and ending quotation marks from the neighboring sentences, and determine the proper quote boundaries. Then, the CRS stores all the segments of the same quote here.

Indexing

Each extracted quotation and attribution is stored as a triple in an inverted index structure of subject-action-object triples. The quotation triples are distinguished from regular triples by a flag isQuotation. During search, only quotation triples will be retrieved when the isQuotation flag is set in the query.

Subject field: store the speaker entity name, the entity's ID, the entity's facets, and the isQuotation flag Subject-modifier field: store modifiers of the speaker Action: store the verb, as well as the isQuotation flag Action-modifier field: store context modifiers of the quotation Object field: store the quote, entities recognized in the quote, and the isQuotation flag For entities identified both within and outside of the quote, the CRS indexes not only the entity names, but also their unique identifiers and assigned categories (e.g., types and facets). Therefore, during search, the CRS supports search for quotes by or about entities by their names, as well as by their IDs or categories (e.g., find quotes made by any college football coach, or find quotes about any hybrid cars).

The subject-modifier field would support search for quotes made by speakers of certain properties, e.g., "Did anyone from Microsoft say anything about iPhone"

Similarly, the action-modifier field supports searching for quotes within a particular context, e.g., "What did Obama say about global warming during his trip to China"

Example 1

Text snippet: Cleveland Cavaliers star LeBron James stuck his nose in the situation, admitting he is counseling Pryor on the pitfalls of being in the spotlight at a young age.

"I'm trying to be that guy who can really help him get through a lot of situations which he's never seen before but now he's seeing and understanding," James said.

In this example, the CRS are able to link "James" as the last name of LeBron James. Through coreference resolution, the CRS resolves the pronouns "he" and "him" to Terrelle Pryor, a football quarterback of the Ohio State University football team. Furthermore, the CRS tags Pryor with facet "football_player". Therefore, when user queries about any comments made by LeBron James on any football players, this quote would be returned as one of the results.

Example 2

Nash said, "I would love to meet him, obviously, and to play hoops with the President would be kind of fun."

This quote is from Steve Nash of the Phoenix Suns NBA basketball team, about President Obama. Through coreference resolution, the CRS recognizes "him" and "the president" refer to President Obama. The CRS assigns the facet "basketball player" to Steve Nash. Therefore, when user queries about any comments made by any basketball players (or any sports athletes) regarding President Obama, this quote would be returned as one of the results.

TABLE 1

| Field | What is indexed |
|---|---|
| Speaker | Entity name = Steve Nash<br>Entity ID = 0x49c26<br>Facet = Basketball player |
| Action | Verb = said, isQuotation |
| Quotation | Keywords = Steve Nash, love, meet, Barack Obama, obviously, play, hoops, president, fun<br>Entity 1:<br>Name = Barack Obama |

TABLE 1-continued

| Field | What is indexed |
|---|---|
| | ID = 0x49c26<br>Facet = Politician, Country leader |

Example 3

"They might think they've got a pretty good jump shot or a pretty good flow, but our kids can't all aspire to be LeBron or Lil Wayne," Obama said.

The CRS recognizes LeBron as LeBron James, the NBA basketball player, and Lil Wayne as a musician. The pronoun "they" is linked to "children" in the previous sentence. When the query is for Obama's quotes regarding basketball player or musician, this quote would be returned.

TABLE 2

| Field | What is indexed |
|---|---|
| Speaker | Entity Name = Barack Obama<br>Entity ID = 0x16f69<br>Facet = Politician, Country Leader |
| Action | Verb = said, isQuotation |
| Quotation | Keywords = children, think, get, pretty, good, jump shot, flow, kids, aspire, LeBron James, Lil Wayne<br>Entity 1:<br>Entity Name = LeBron James<br>Entity ID = 0x49c85<br>Facet = Basketball player<br>Entity 2:<br>Name = Lil Wayne<br>ID = 0x15393<br>Facet = Musician |

Search Query

The CRS supports querying of quotations in many different ways, in the form of a template: What did <speaker> say about <subject>?

The parameter <speaker> can be specified as:
an entity, by its unique identifier or simply its name
a facet, e.g., football player
or anyone Furthermore, the speaker field can be constrained by some modifiers, e.g.,
"What did any <football_player> from Notre Dame say" where Notre Dame is the modifier.

The <subject> can be specified as:
an entity, by its unique identifier or name
an entity facet, e.g., movies, hybrid cars
any keywords
or anything The CRS also supports boolean combinations (e.g., AND, OR) of the above. For example:
What did Obama say about China AND global warming
What did Peyton Maning say about other football teams OR football coaches
Find quotes by any actors about the Oscars AND any movies.

Result Presentation

The query result returned is a list of quotations, that contain the following:
actual quote; the starting and ending positions of the quote are marked
quote attribution—speaker name and its modifiers context—text outside the quote document metadata, e.g., document title, publication date, publisher name, and the like.

Sometimes, the quote is very long such that the CRS needs to extract a snippet of a specified length that best matches the query request. During processing and indexing, the CRS has identified the entities in each sentence, as well as their positions within the sentence. Given a query request on a particular subject (specified as entity or keyword), the CRS determines the snippet that has most occurrences of the subject entity/keyword.

Result Aggregation and Ranking

Sometimes, what was said by a speaker could be quoted in different documents. When retrieving quotes, the CRS applies an aggregation process to detect duplicate quotes by computing the similarity between each pair of quotes.

The quotes are then ranked by a combination of the following factors:

1. publication date. The CRS prefers quotes with fresher date.
2. Number of duplicates. Usually, important or significant quotes are repeated more often.
3. Credibility of the source, e.g., articles from major newspapers have higher credibility than less known blogs.

Users can choose to sort the results by their default rank or purely by date.

Example Quotation Recommendation API

A. Getting Quotations

1. Description

Returns quotations made about a topic in the Evri corpus of news, blog and other web content. In addition, quotations made by a specific person may be returned.

2. Usage

The API can be invoked with a request of the following form:
quotations/[about]?[inputParameters]
&speaker=SPEAKER&[inputParameters]
where SPEAKER is the URI, or href, of a person and applicable inputParameters include: facet, entityURI, includeDomains, excludeDomains, includeDates, includeMatchedLocations, and callback.

3. Examples

Quotations by a Person about Anything: http://api.evri.com/v1/quotations?speaker=/person/barack-obama-0x16f69&appId=evri.com-restdoc Quotations by anyone about a specific entity: http://api.evri.com/v1/quotations/about?entityURI=/location/united-states-0x2ae4b&appId=evri.com-restdoC Quotations by Anyone about a Facet:
http://api.evri.com/v1/quotations/about?facet=politician&appId=evri.com-restdoc Quotations by a Person about an Entity:
http://api.evri.com/v1/quotations/about?entityURI=/person/george-w.-bush-0x1beeb&speaker=/person/barack-obama-0x16f69&appId=evri.com-restdoc Quotations by a Person about any Entity of a Facet:
http://api.evri.com/v1/quotations/about?facet=politician&speaker=/person/barack-obama-0x16f69&appId=evri.com-restdoc B. Input Parameters The following parameters affect output results. See the usage section for each resource to assess applicability.

TABLE 3

| Input | Description | Values | Default |
|---|---|---|---|
| text | Text containing natural language | String of natural language text. For articles, title followed by 2 line breaks and the article body. | None |
| queryToken | Token encapsulating trigger text context information | String returned as a part of an entity network | None |
| articleSnippetLength | Desired length of snippets in characters | 1 . . . N | 195 |
| includeMatchedLocations | True if matched locations are desired | 1 of: 0, 1, false, true | False |
| entityURI | A unique identifier to an entity. | An entityURI | None |
| facet | A unique identifier to a facet. | A valid entity facet | None |
| type | A unique identifier to a media type unless otherwise specified in a particular resource. | 1 or more of: article, video, image | Article |
| startId | Sets id for start index | 0 . . . N | 0 |
| resultsPerPage | Number of desired results per page | 0 . . . N | 10 |
| includeDomains | Constrain article results to specified domains | 1 or more domains comma separated | All domains |
| excludeDomains | Limit articles to domains not included | 1 or more domains comma separated | None |
| includeDates | Limit articles to dates listed | 1 to 3 dates comma separated in YYYYMMDD format | None |
| callback | Response applies JSONP format using callback of the specified name | Any string | None |
| appId | Unique application identifier | A string of the form \[hostname\]-\[app name\] | None |

Example Entity Types

The following Table defines several example entity types in an example embodiment. Other embodiments may incorporate different types.

TABLE 4

Person
Organization
Location
Concept
Event

TABLE 4-continued

Product
Condition
Organism
Substance

Example Facets

The following Table defines several example facets in an example embodiment. Other embodiments may incorporate different facets.

TABLE 5

PERSON actor Evri/Person/Entertainment/Actor
PERSON animator Evri/Person/Entertainment/Animator
PERSON cinematographer Evri/Person/Entertainment/Cinematographer
PERSON comedian Evri/Person/Entertainment/Comedian
PERSON fashion_designer Evri/Person/Entertainment/Fashion_Designer
PERSON musician Evri/Person/Entertainment/Musician
PERSON composer Evri/Person/Entertainment/Musician/Composer
PERSON producer Evri/Person/Entertainment/Producer
PERSON director Evri/Person/Entertainment/Director
PERSON radio_personality Evri/Person/Entertainment/Radio_Personality
PERSON television_personality Evri/Person/Entertainment/Television_Personality
PERSON author Evri/Person/Entertainment/Author
PERSON model Evri/Person/Entertainment/Model
PERSON screenwriter Evri/Person/Entertainment/Screenwriter
PERSON playwright Evri/Person/Entertainment/Playwright
PERSON conductor Evri/Person/Entertainment/Conductor
PRODUCT film Evri/Product/Entertainment/Movie
PRODUCT television_show Evri/Product/Entertainment/Television_Show
PRODUCT album Evri/Product/Entertainment/Album
PRODUCT musical Evri/Product/Entertainment/Musical
PRODUCT book Evri/Product/Entertainment/Book
PRODUCT newspaper Evri/Product/Publication
PERSON politician Evri/Person/Politics/Politician
PERSON cabinet_member Evri/Person/Politics/Cabinet_Member
PERSON government_person Evri/Person/Politics/Government_Person
PERSON political_party_leader Evri/Person/Politics/Political_Party_Leader
PERSON judge Evri/Person/Politics/Judge
PERSON country_leader Evri/Person/Politics/Politician/World_Leader
PERSON joint_chiefs_of_staff
Evri/Person/Politics/Politician/Joint_Chiefs_of_Staff
PERSON white_house_staff Evri/Person/Politics/White_House_Staff
PERSON activist Evri/Person/Politics/Activist
PERSON lobbyist Evri/Person/Politics/Lobbyist
PERSON ambassador Evri/Person/Politics/Ambassador
PERSON analyst Evri/Person/Analyst
PERSON journalist Evri/Person/Journalist
PERSON blogger Evri/Person/Blogger
ORGANIZATION band Evri/Organization/Entertainment/Band
ORGANIZATION political_party Evri/Organization/Politics/Political_Party
ORGANIZATION advocacy_group Evri/Organization/Politics/Advocacy_Group
EVENT film_award_ceremony Evri/Event/Entertainment/Film_Award_Ceremony
EVENT music_award_ceremony Evri/Event/Entertainment/Music_Award_Ceremony
EVENT television_award_ceremony Evri/Event/Entertainment/Television_Award_Ceremony
EVENT court_case Evri/Event/Politics/Court_Case
ORGANIZATION television_network
Evri/Organization/Entertainment/Company/Television_Network
ORGANIZATION music_production_company
Evri/Organization/Entertainment/Company/Music_Production_Company
ORGANIZATION film_production_company
Evri/Organization/Entertainment/Company/Film_Production_Company
LOCATION congressional_district Evri/Location/Politics/Congressional_District
LOCATION military_base Evri/Location/Politics/Military_Base
ORGANIZATION congressional_committee Evri/Organization/Politics/Congressional_Committee
ORGANIZATION international_organization
Evri/Organization/Politics/International_Organization
ORGANIZATION government_agency Evri/Organization/Politics/Government_Agency
ORGANIZATION armed_force Evri/Organization/Politics/Armed_Force
ORGANIZATION terrorist_organization
Evri/Organization/Politics/Terrorist_Organization
ORGANIZATION us_court Evri/Organization/Politics/US_Court
ORGANIZATION cabinet_department Evri/Organization/Politics/Cabinet_Department
LOCATION continent Evri/Location/Continent
LOCATION geographic_region Evri/Location/Geographic_Region TABLE 5-continued

```
LOCATION country Evri/Location/Country
LOCATION province Evri/Location/Province
LOCATION state Evri/Location/State
LOCATION city Evri/Location/City
LOCATION us_city Evri/Location/City
LOCATION neighborhood Evri/Location/Neighborhood
LOCATION building Evri/Location/Structure/Building
LOCATION island Evri/Location/Island
LOCATION mountain Evri/Location/Mountain
LOCATION body_of_water Evri/Location/Body_of_Water
ORGANIZATION media_companyEvri/Organization/Entertainment/Company/Media_Company
ORGANIZATION haute_couture_house
Evri/Organization/Entertainment/Company/Haute_Couture_House
ORGANIZATION publishing_company
Evri/Organization/Entertainment/Company/Publishing_Company
ORGANIZATION entertainment_company Evri/Organization/Entertainment/Company
CONCEPT fictional_character Evri/Concept/Entertainment/Fictional_Character
PERSON military_leader Evri/Person/Politics/Military_Leader
PERSON military_person Evri/Person/Politics/Military_Person
EVENT military_conflict Evri/Event/Politics/Military_Conflict
PERSON terrorist Evri/Person/Politics/Terrorist
PERSON criminal Evri/Person/Criminal
PERSON explorer Evri/Person/Explorer
PERSON inventor Evri/Person/Technology/Inventor
PERSON lawyer Evri/Person/Lawyer
PERSON artist Evri/Person/Artist
PERSON painter Evri/Person/Artist/Painter
PERSON revolutionary Evri/Person/Revolutionary
PERSON spiritual_leader Evri/Person/Spiritual_Leader
PERSON philosopher Evri/Person/Philosopher
PERSON anthropologist Evri/Person/Anthropologist
PERSON architect Evri/Person/Architect
PERSON historian Evri/Person/Historian
PERSON editor Evri/Person/Editor
PERSON astronaut Evri/Person/Astronaut
PERSON photographer Evri/Person/Photographer
PERSON scientist Evri/Person/Technology/Scientist
PERSON economist Evri/Person/Economist
PERSON technology_person Evri/Person/Technology/Technology_Person
PERSON business_person Evri/Person/Business/Business_Person
PERSON stock_trader Evri/Person/Business/Business_Person/Stock_Trader
PERSON first_lady Evri/Person/Politics/First_Lady
ORGANIZATION us_state_legislature
Evri/Organization/Politics/Legislative_Body/State_Legislature
ORGANIZATION legislative_body Evri/Organization/Politics/Legislative_Body
ORGANIZATION executive_body Evri/Organization/Politics/Executive_Body
PERSON team_owner Evri/Person/Sports/Team_Owner
PERSON sports_announcer Evri/Person/Sports/Sports_Announcer
PERSON sports_executive Evri/Person/Sports/Sports_Executive
PERSON olympic_medalist Evri/Person/Sports/Olympic_Medalist
PERSON athlete Evri/Person/Sports/Athlete
PERSON coach Evri/Person/Sports/Coach
PERSON sports_official Evri/Person/Sports/Sports_Official
PERSON motorcycle_driver Evri/Person/Sports/Athlete/Motorcycle_Rider
PERSON race_car_driver Evri/Person/Sports/Athlete/Race_car_Driver
ORGANIZATION auto_racing_team Evri/Organization/Sports/Auto_Racing_Team
PERSON baseball_player Evri/Person/Sports/Athlete/Baseball_Player
ORGANIZATION baseball_team Evri/Organization/Sports/Baseball_Team
PERSON basketball_player Evri/Person/Sports/Athlete/Basketball_Player
ORGANIZATION basketball_team Evri/Organization/Sports/Basketball_Team
PERSON football_player Evri/Person/Sports/Athlete/Football_Player
ORGANIZATION football_team Evri/Organization/Sports/Football_Team
PERSON hockey_player Evri/Person/Sports/Athlete/Hockey_Player
ORGANIZATION hockey_team Evri/Organization/Sports/Hockey_Team
PERSON soccer_player Evri/Person/Sports/Athlete/Soccer_Player
ORGANIZATION soccer_team Evri/Organization/Sports/Soccer_Team
ORGANIZATION sports_league Evri/Organization/Sports/Sports_League
PERSON cricketer Evri/Person/Sports/Athlete/Cricketer
ORGANIZATION cricket_team Evri/Organization/Sports/Cricket_Team
PERSON cyclist Evri/Person/Sports/Athlete/Cyclist
ORGANIZATION cycling_team Evri/Organization/Sports/Cycling_Team
PERSON volleyball_player Evri/Person/Sports/Athlete/Volleyball_Player
ORGANIZATION volleyball_team Evri/Organization/Sports/Volleyball_Team
PERSON rugby_player Evri/Person/Sports/Athlete/Rugby_Player
ORGANIZATION rugby_team Evri/Organization/Sports/Rugby_Team
PERSON boxer Evri/Person/Sports/Athlete/Boxer
PERSON diver Evri/Person/Sports/Athlete/Diver
PERSON golfer Evri/Person/Sports/Athlete/Golfer
PERSON gymnast Evri/Person/Sports/Athlete/Gymnast
PERSON figure_skater Evri/Person/Sports/Athlete/Figure_Skater
```

TABLE 5-continued

```
PERSON horse_racing_jockey Evri/Person/Sports/Athlete/Horse_Racing_Jockey
PERSON lacrosse_player Evri/Person/Sports/Athlete/Lacrosse_Player
ORGANIZATION lacrosse_team Evri/Organization/Sports/Lacrosse_Team
PERSON rower Evri/Person/Sports/Athlete/Rower
PERSON swimmer Evri/Person/Sports/Athlete/Swimmer
PERSON tennis_player Evri/Person/Sports/Athlete/Tennis_Player
PERSON track_and_field_athlete Evri/Person/Sports/Athlete/Track_and_Field_Athlete
PERSON wrestler Evri/Person/Sports/Athlete/Wrestler
PERSON triathlete Evri/Person/Sports/Athlete/Triathlete
EVENT sports_competition Evri/Event/Sports/Sports_Event/Sporting_Competition
EVENT sports_event Evri/Event/Sports/Sports_Event
EVENT olympic_sport Evri/Event/Sports/Olympic_Sports
EVENT election Evri/Event/Politics/Election
LOCATION sports_venue Evri/Location/Sports/Sports_Venue
ORGANIZATION sports_division Evri/Organization/Sports/Sports_Division
ORGANIZATION sports_event_promotion_company
Evri/Organization/Sports/Sports_Event_Promotion_Company
ORGANIZATION sports_organization Evri/Organization/Sports/Sports_Organization
ORGANIZATION company Evri/Organization/Business/Company
ORGANIZATION news_agency Evri/Organization/Business/Company/News_Agency
PRODUCT cell_phone Evri/Product/Technology/Cell_Phone
PRODUCT computer Evri/Product/Technology/Computer
PRODUCT software Evri/Product/Technology/Software
PRODUCT video_game Evri/Product/Technology/Software/Video_Game
PRODUCT video_game_console Evri/Product/Technology/Video_Game_Console
PRODUCT media_player Evri/Product/Technology/Media_player
ORGANIZATION website Evri/Organization/Technology/Website
ORGANIZATION technology_company Evri/Organization/Technology/Company
PRODUCT magazine Evri/Product/Publication
ORGANIZATION financial_services_company
Evri/Organization/Business/Company/Financial_Services_Company
ORGANIZATION radio_network Evri/Organization/Entertainment/Company/Radio_Network
ORGANIZATION futures_exchange Evri/Organization/Business/Futures_Exchange
ORGANIZATION stock_exchange Evri/Organization/Business/Stock_Exchange
ORGANIZATION government_sponsored_enterprise
Evri/Organization/Politics/Government_Sponsored_Enterprise
ORGANIZATION political_organization Evri/Organization/Politics/Political_organization
ORGANIZATION labor_union Evri/Organization/Politics/Labor_Union
ORGANIZATION nonprofit_corporation
Evri/Organization/Business/Company/Nonprofit_Corporation
ORGANIZATION nonprofit_organization Evri/Organization/Nonprofit_Organization
ORGANIZATION national_laboratory Evri/Organization/Politics/National_Laboratory
ORGANIZATION unified_combatant_commands
Evri/Organization/Politics/Unified_Combatant_Commands
ORGANIZATION research_institute Evri/Organization/Research_Institute
CONCEPT stock_market_index Evri/Concept/Business/Stock_Market_Index
PERSON business_executive Evri/Person/Business/Business_Person/Business_Executive
PERSON corporate_director Evri/Person/Business/Business_Person/Corporate_Director
PERSON banker Evri/Person/Business/Business_Person/Banker
PERSON publisher Evri/Person/Business/Business_Person/Publisher
PERSON us_politician Evri/Person/Politics/U.S._Politician
PERSON nobel_laureate Evri/Person/Nobel_Laureate
PERSON chemist Evri/Person/Chemist
PERSON physicist Evri/Person/Physicist
ORGANIZATION business_organization Evri/Organization/Business/Business_Organization
ORGANIZATION consumer_organization Evri/Organization/Business/Consumer_Organization
ORGANIZATION professional_association Evri/Organization/Business/Professional_Association
PERSON investor Evri/Person/Business/Business_Person/Investor
PERSON financier Evri/Person/Business/Business_Person/Financier
PERSON money_manager Evri/Person/Business/Business_Person/Money_Manager
ORGANIZATION aerospace_company
Evri/Organization/Business/Company/Aerospace_Company
ORGANIZATION advertising_agency
Evri/Organization/Business/Company/Advertising_Company
ORGANIZATION agriculture_company
Evri/Organization/Business/Company/Agriculture_Company
ORGANIZATION airline Evri/Organization/Business/Company/Airline
ORGANIZATION architecture_firm Evri/Organization/Business/Company/Architecture_Firm
ORGANIZATION automotive_company
Evri/Organization/Business/Company/Automotive_Company
ORGANIZATION chemical_company Evri/Organization/Business/Company/Chemical_Company
ORGANIZATION clothing_company Evri/Organization/Business/Company/Clothing_Company
ORGANIZATION consulting_company
Evri/Organization/Business/Company/Consulting_Company
ORGANIZATION cosmetics_company
Evri/Organization/Business/Company/Cosmetics_Company
ORGANIZATION defense_company Evri/Organization/Business/Company/Defense_Company
ORGANIZATION distribution_company
Evri/Organization/Business/Company/Distribution_Company
ORGANIZATION gaming_company Evri/Organization/Business/Company/Gaming_Company
```

TABLE 5-continued

```
ORGANIZATION electronics_company
Evri/Organization/Business/Company/Electronics_Company
ORGANIZATION energy_company Evri/Organization/Business/Company/Energy_Company
ORGANIZATION hospitality_company
Evri/Organization/Business/Company/Hospitality_Company
ORGANIZATION insurance_company Evri/Organization/Business/Company/Insurance_Company
ORGANIZATION law_firm Evri/Organization/Business/Company/Law_Firm
ORGANIZATION manufacturing_company
Evri/Organization/Business/Company/Manufacturing_Company
ORGANIZATION mining_company Evri/Organization/Business/Company/Mining_Company
ORGANIZATION pharmaceutical_company
Evri/Organization/Business/Company/Pharmaceutical_Company
ORGANIZATION railway_company Evri/Organization/Business/Company/Railway
ORGANIZATION real_estate_company
Evri/Organization/Business/Company/Real_Estate_Company
ORGANIZATION retailer Evri/Organization/Business/Company/Retailer
ORGANIZATION shipping_company Evri/Organization/Business/Company/Shipping_Company
ORGANIZATION software_company
Evri/Organization/Technology/Company/Software_Company
ORGANIZATION steel_company Evri/Organization/Business/Company/Steel_Company
ORGANIZATION telecommunications_company
Evri/Organization/Business/Company/Telecommunications_Company
ORGANIZATION utilities_company Evri/Organization/Business/Company/Utilities_Company
ORGANIZATION wholesaler Evri/Organization/Business/Company/Wholesaler
ORGANIZATION television_production_company
Evri/Organization/Entertainment/Company/Television_Production_Company
ORGANIZATION food_company Evri/Organization/Business/Company/Food_Company
ORGANIZATION beverage_company
Evri/Organization/Business/Company/Food_Company/Beverage_Company
ORGANIZATION restaurant Evri/Organization/Business/Company/Food_Company/Restaurant
ORGANIZATION winery
Evri/Organization/Business/Company/Food_Company/Beverage_Company
EVENT film_festival Evri/Event/Entertainment/Film_Festival
ORGANIZATION film_festival Evri/Event/Entertainment/Film_Festival
PRODUCT anime Evri/Product/Entertainment/Anime
PRODUCT aircraft Evri/Product/Aircraft
PRODUCT military_aircraft Evri/Product/Aircraft/Military_Aircraft
PRODUCT vehicle Evri/Product/Vehicle
PRODUCT ballet Evri/Product/Entertainment/Ballet
PRODUCT opera Evri/Product/Entertainment/Opera
PRODUCT painting Evri/Product/Entertainment/Painting
PRODUCT song Evri/Product/Entertainment/Single
EVENT technology_conference Evri/Event/Technology/Technology_Conference
CONCEPT legislation Evri/Concept/Politics/Legislation
CONCEPT treaty Evri/Concept/Politics/Treaty
ORGANIZATION trade_association Evri/Organization/Business/Trade_Association
ORGANIZATION technology_organization
Evri/Organization/Technology/Technology_Organization
ORGANIZATION educational_institution Evri/Organization/Educational_Institution
LOCATION museum Evri/Location/Structure/Building/Museum
LOCATION religious_building Evri/Location/Structure/Building/Religious_Building
PERSON astronomer Evri/Person/Astronomer
PERSON mathematician Evri/Person/Mathematician
PERSON academic Evri/Person/Academic
PERSON dancer Evri/Person/Entertainment/Dancer
PRODUCT play Evri/Product/Entertainment/Play
LOCATION botanical_garden Evri/Location/Botanical_Garden
LOCATION hospital Evri/Location/Health/Hospital
PERSON psychiatrist Evri/Person/Health/Psychiatrist
PERSON physician Evri/Person/Health/Physician
PERSON nurse Evri/Person/Health/Nurse
ORGANIZATION journalism_organization Evri/Organization/Journalism_Organization
ORGANIZATION healthcare_company
Evri/Organization/Business/Company/Healthcare_Company
ORGANIZATION religious_organization Evri/Organization/Religious_Organization
PERSON biologist Evri/Person/Scientist/Biologist
PERSON biochemist Evri/Person/Scientist/Biochemist
PERSON botanist Evri/Person/Scientist/Botanist
PERSON poet Evri/Person/Entertainment/Author/Poet
PERSON curler Evri/Person/Sports/Athlete/Curler
PERSON biathlete Evri/Person/Sports/Athlete/Biathlete
PERSON alpine_skier Evri/Person/Sports/Athlete/Alpine_Skier
PERSON cross-country_skier Evri/Person/Sports/Athlete/Cross-country_Skier
PERSON freestyle_skier Evri/Person/Sports/Athlete/Freestyle_Skier
PERSON luger Evri/Person/Sports/Athlete/Luger
PERSON nordic_combined_skier Evri/Person/Sports/Athlete/Nordic_Combined_Skier
PERSON speed_skater Evri/Person/Sports/Athlete/Speed_Skater
PERSON skeleton_racer Evri/Person/Sports/Athlete/Skeleton_Racer
PERSON ski_jumper Evri/Person/Sports/Athlete/Ski_Jumper
PERSON snowboarder Evri/Person/Sports/Athlete/Snowboarder
```

TABLE 5-continued

```
PERSON bobsledder Evri/Person/Sports/Athlete/Bobsledder
PERSON bodybuilder Evri/Person/Sports/Athlete/Bodybuilder
PERSON equestrian Evri/Person/Sports/Athlete/Equestrian
PERSON fencer Evri/Person/Sports/Athlete/Fencer
PERSON hurler Evri/Person/Sports/Athlete/Hurler
PERSON martial_artist Evri/Person/Sports/Athlete/Martial_Artist
PERSON canoer Evri/Person/Sports/Athlete/Canoer
LOCATION music_venue Evri/Location/Entertainment/Music_Venue
LOCATION aquarium Evri/Location/Aquarium
LOCATION cemetery Evri/Location/Cemetery
LOCATION national_park Evri/Location/National_Park
LOCATION volcano Evri/Location/Volcano
LOCATION zoo Evri/Location/Zoo
LOCATION structure Evri/Location/Structure
LOCATION airport Evri/Location/Structure/Airport
LOCATION bridge Evri/Location/Structure/Bridge
LOCATION hotel Evri/Location/Structure/Hotel
LOCATION palace Evri/Location/Structure/Palace
LOCATION monument Evri/Location/Structure/Monument
LOCATION street Evri/Location/Street
LOCATION amusement_park Evri/Location/Amusement_Park
LOCATION unitary_authority Evri/Location/Unitary_Authority
PRODUCT drug_brand Evri/Product/Health/Drug_Brand
PRODUCT weapon Evri/Product/Weapon
PRODUCT missile_system Evri/Product/Weapon/Missile_System
PRODUCT firearm Evri/Product/Weapon/Firearm
PRODUCT artillery Evri/Product/Weapon/Artillery
PRODUCT anti-aircraft_weapon Evri/Product/Weapon/Anti-aircraft_Weapon
PRODUCT anti-tank_weapon Evri/Product/Weapon/Anti-tank_Weapon
PRODUCT biological_weapon Evri/Product/Weapon/Biological_Weapon
PRODUCT chemical_weapon Evri/Product/Weapon/Chemical_Weapon
CHEMICAL chemical_weapon Evri/Product/Weapon/Chemical_Weapon
SUBSTANCE chemical_weapon Evri/Product/Weapon/Chemical_Weapon
PRODUCT explosive Evri/Product/Weapon/Explosive
PRODUCT weapons_launcher Evri/Product/Weapon/Weapons_Launcher
PERSON chess_player Evri/Person/Chess_Player
PERSON sculptor Evri/Person/Artist/Sculptor
PRODUCT game Evri/Product/Game
ORGANIZATION theater_company
  Evri/Organization/Entertainment/Company/Theater_Company
PERSON badminton_player Evri/Person/Sports/Athlete/Badminton_Player
PRODUCT naval_ship Evri/Product/Watercraft/Naval_Ship
PRODUCT battleship Evri/Product/Watercraft/Naval_Ship/Battleship
PRODUCT cruiser Evri/Product/Watercraft/Naval_Ship/Cruiser
PRODUCT aircraft_carrier Evri/Product/Watercraft/Naval_Ship/Aircraft_Carrier
PRODUCT destroyer Evri/Product/Watercraft/Naval_Ship/Destroyer
PRODUCT frigate Evri/Product/Watercraft/Naval_Ship/Frigate
PRODUCT submarine Evri/Product/Watercraft/Naval_Ship/Submarine
PRODUCT cruise_ship Evri/Product/Watercraft/Cruise_Ship
PRODUCT yacht Evri/Product/Watercraft/Yacht
PRODUCT ocean_liner Evri/Product/Watercraft/Ocean_Liner
LOCATION county Evri/Location/County
PRODUCT symphony Evri/Product/Entertainment/Symphony
ORGANIZATION television_station
  Evri/Organization/Entertainment/Company/Television_Station
ORGANIZATION radio_station Evri/Organization/Entertainment/Company/Radio_Station
CONCEPT constitutional_amendment Evri/Concept/Politics/Constitutional_Amendment
PERSON australian_rules_footballer Evri/Person/Sports/Athlete/Australian_Rules_Footballer
ORGANIZATION australian_rules_football_team
  Evri/Organization/Sports/Australian_Rules_Football_Team
ORGANIZATION criminal_organization Evri/Organization/Criminal_Organization
PERSON poker_player Evri/Person/Poker_Player
PERSON bowler Evri/Person/Sports/Athlete/Bowler
PERSON yacht_racer Evri/Person/Sports/Athlete/Yacht_Racer
PERSON water_polo_player Evri/Person/Sports/Athlete/Water_Polo_Player
PERSON field_hockey_player Evri/Person/Sports/Athlete/Field_Hockey_Player
PERSON skateboarder Evri/Person/Sports/Athlete/Skateboarder
PERSON polo_player Evri/Person/Sports/Athlete/Polo_Player
PERSON gaelic_footballer Evri/Person/Sports/Athlete/Gaelic_Footballer
PRODUCT programming_language Evri/Product/Technology/Programming_Language
PERSON engineer Evri/Person/Technology/Engineer
EVENT cybercrime Evri/Event/Technology/Cybercrime
EVENT criminal_act Evri/Event/Criminal_Act
PERSON critic Evri/Person/Critic
PERSON pool_player Evri/Person/Pool_Player
PERSON snooker_player Evri/Person/Snooker_Player
PERSON competitive_eater Evri/Person/Competitive_Eater
PRODUCT data_storage_medium Evri/Product/Technology/Data_Storage_Medium
PRODUCT data_storage_device Evri/Product/Technology/Data_Storage_Device
PERSON mountain_climber Evri/Person/Mountain_Climber
```

TABLE 5-continued

```
PERSON aviator Evri/Person/Aviator
ORGANIZATION cooperative Evri/Organization/Cooperative
CONCEPT copyright_license Evri/Concept/Copyright_License
EVENT observance Evri/Event/Observance
PERSON outdoor_sportsperson Evri/Person/Sports/Outdoor_Sportsperson
PERSON rodeo_performer Evri/Person/Sports/Rodeo_Performer
PERSON sports_shooter Evri/Person/Sports/Athlete/Sports_Shooter
CONCEPT award Evri/Concept/Award
CONCEPT entertainment_series Evri/Concept/Entertainment/Entertainment_Series
PERSON chef Evri/Person/Chef
PERSON cartoonist Evri/Person/Entertainment/Cartoonist
PERSON comics_creator Evri/Person/Entertainment/Comics_Creator
PERSON nobility Evri/Person/Nobility
PERSON porn_star Evri/Person/Porn_Star
PERSON archaeologist Evri/Person/Scientist/Archaeologist
PERSON paleontologist Evri/Person/Scientist/Paleontologist
PERSON victim_of_crime Evri/Person/Victim_of_Crime
LOCATION region Evri/Location/Region
PERSON linguist Evri/Person/Linguist
PERSON librarian Evri/Person/Librarian
PERSON bridge_player Evri/Person/Bridge_Player
PERSON choreographer Evri/Person/Entertainment/Choreographer
PRODUCT camera Evri/Product/Technology/Camera
PRODUCT publication Evri/Product/Publication
PRODUCT comic Evri/Product/Entertainment/Comic
PRODUCT short_story Evri/Product/Entertainment/Short_Story
ORGANIZATION irregular_military_organization
Evri/Organization/Irregular_Military_Organization
SUBSTANCE chemical_element Evri/Substance/Chemical_Element
SUBSTANCE alkaloid Evri/Substance/Organic_Compound/Alkaloid
SUBSTANCE glycoside Evri/Substance/Glycoside
SUBSTANCE amino_acid Evri/Substance/Amino_Acid
SUBSTANCE protein Evri/Substance/Protein
SUBSTANCE enzyme Evri/Substance/Enzyme
SUBSTANCE hormone Evri/Substance/Hormone
SUBSTANCE hydrocarbon Evri/Substance/Organic_Compound/Hydrocarbon
SUBSTANCE inorganic_compound Evri/Substance/Inorganic_Compound
SUBSTANCE lipid Evri/Substance/Organic_Compound/Lipid
SUBSTANCE steroid Evri/Substance/Organic_Compound/Lipid/Steroid
SUBSTANCE molecule Evri/Substance/Molecule
SUBSTANCE polymer Evri/Substance/Molecule/Polymer
SUBSTANCE terpene Evri/Substance/Organic_Compound/Terpene
SUBSTANCE toxin Evri/Substance/Toxin
SUBSTANCE antibiotic Evri/Substance/Health/Antibiotic
SUBSTANCE antioxidant Evri/Substance/Health/Antioxidant
SUBSTANCE anti-inflammatory Evri/Substance/Health/Anti-inflammatory
SUBSTANCE antiasthmatic_drug Evri/Substance/Health/Antiasthmatic_drug
SUBSTANCE anticonvulsant Evri/Substance/Health/Anticonvulsant
SUBSTANCE antihistamine Evri/Substance/Health/Antihistamine
SUBSTANCE antihypertensive Evri/Substance/Health/Antihypertensive
SUBSTANCE antiviral Evri/Substance/Health/Antiviral
SUBSTANCE painkiller Evri/Substance/Health/Painkiller
SUBSTANCE Painkiller Evri/Substance/Health/Painkiller
SUBSTANCE anesthetic Evri/Substance/Health/Anesthetic
SUBSTANCE antibody Evri/Substance/Antibody
SUBSTANCE chemotherapeutic_drug Evri/Substance/Health/Chemotherapeutic
SUBSTANCE anti-diabetic_drug Evri/Substance/Health/Anti-diabetic
SUBSTANCE antianginal_drug Evri/Substance/Health/Antianginal
SUBSTANCE muscle_relaxant Evri/Substance/Health/Muscle_relaxant
SUBSTANCE hypolipidemic_drug Evri/Substance/Health/Hypolipidemic_Drug
SUBSTANCE psychoactive_drug Evri/Substance/Health/Psychoactive_Drug
SUBSTANCE vaccine Evri/Substance/Health/Vaccine
SUBSTANCE gastrointestinal_drug Evri/Substance/Health/Gastrointestinal_Drug
SUBSTANCE erectile_dysfunction_drug Evri/Substance/Health/Erectile_Dysfunction_Drug
SUBSTANCE organometallic_compound
Evri/Substance/Organic_Compound/Organometallic_Compound
SUBSTANCE phenol Evri/Substance/Organic_Compound/Phenol
SUBSTANCE ketone Evri/Substance/Organic_Compound/Ketone
SUBSTANCE amide Evri/Substance/Organic_Compound/Amide
SUBSTANCE ester Evri/Substance/Organic_Compound/Ester
SUBSTANCE ether Evri/Substance/Organic_Compound/Ether
SUBSTANCE heterocyclic_compound
Evri/Substance/Organic_Compound/Heterocyclic_Compound
SUBSTANCE organic_compound Evri/Substance/Organic_Compound
SUBSTANCE carbohydrate Evri/Substance/Organic_Compound/Carbohydrate
SUBSTANCE peptide Evri/Substance/Organic_Compound/Peptide
SUBSTANCE organohalide Evri/Substance/Organic_Compound/Organohalide
SUBSTANCE organosulfur_compound
Evri/Substance/Organic_Compound/Organosulfur_Compound
SUBSTANCE aromatic_compound Evri/Substance/Organic_Compound/Aromatic_Compound
```

TABLE 5-continued

```
SUBSTANCE carboxylic_acid Evri/Substance/Organic_Compound/Carboxylic_Acid
SUBSTANCE nucleic_acid Evri/Substance/Nucleic_Acid
SUBSTANCE ion Evri/Substance/Ion
ORGANISM cyanobacterium Evri/Organism/Health/Cyanobacterium
ORGANISM gram-positive_bacterium Evri/Organism/Health/Gram-positive_Bacterium
ORGANISM gram-negative_bacterium Evri/Organism/Health/Gram-negative_Bacterium
ORGANISM acid-fast_bacterium Evri/Organism/Health/Acid-fast_Bacterium
ORGANISM dna_virus Evri/Organism/Health/DNA_Virus
ORGANISM rna_virus Evri/Organism/Health/RNA_Virus
CONDITION symptom Evri/Condition/Health/Symptom
CONDITION injury Evri/Condition/Health/Injury
CONDITION inflammation Evri/Condition/Health/Inflammation
CONDITION disease Evri/Condition/Health/Disease
CONDITION cancer Evri/Condition/Health/Disease/Cancer
ORGANISM medicinal_plant Evri/Organism/Health/Medicinal_Plant
ORGANISM poisonous_plant Evri/Organism/Poisonous_Plant
ORGANISM herb Evri/Organism/Herb
CONCEPT medical_procedure Evri/Concept/Health/Medical_Procedure
ORGANISM bacterium Evri/Organism/Health/Bacterium
ORGANISM virus Evri/Organism/Health/Virus
ORGANISM horse Evri/Organism/Horse
PERSON fugitive Evri/Person/Fugitive
ORGANIZATION military_unit Evri/Organization/Politics/Military_Unit
ORGANIZATION law_enforcement_agency
Evri/Organization/Politics/Law_Enforcement_Agency
LOCATION golf_course Evri/Location/Golf_Course
PERSON law_enforcement_agent Evri/Person/Politics/Law_Enforcement_Agent
PERSON magician Evri/Person/Entertainment/Magician
LOCATION educational_institution Evri/Organization/Educational_Institution
CONCEPT social_program Evri/Concept/Politics/Social_Program
EVENT international_conference Evri/Event/Politics/International_Conference
```

All of the above U.S. patents, U.S. patent application publications, U.S. patent applications, foreign patents, foreign patent applications and non-patent publications referred to in this specification and/or listed in the Application Data Sheet, including but not limited to U.S. application Ser. No. 14/169,972 filed Jan. 31, 2014, entitled "NLP-BASED SYSTEMS AND METHODS FOR PROVIDING QUOTATIONS," U.S. application Ser. No. 13/075,799 filed Mar. 30, 2011, entitled "NLP-BASED SYSTEMS AND METHODS FOR PROVIDING QUOTATIONS," which claims the benefit of U.S. Patent Application No. 61/319,029, entitled "NLP-BASED SYSTEMS AND METHODS FOR PROVIDING QUOTATIONS," filed Mar. 30, 2010, are incorporated herein by reference, in their entireties.

From the foregoing it will be appreciated that, although specific embodiments have been described herein for purposes of illustration, various modifications may be made without deviating from the spirit and scope of this disclosure. For example, the methods, techniques, and systems for content recommendation are applicable to other architectures. For example, instead of utilizing a Vector Space Model of document indexing, systems that are programmed to perform natural language processing (e.g., parts of speech tagging) can be employed. Also, the methods, techniques, and systems discussed herein are applicable to differing query languages, protocols, communication media (optical, wireless, cable, etc.) and devices (such as wireless handsets, mobile communications devices, electronic organizers, personal digital assistants, portable email machines, game machines, pagers, navigation devices such as GPS receivers, etc.).

The invention claimed is:

1. A method in a content recommendation system in a computer system having a computer processor, the method comprising:

automatically providing quotation information by:
by the computer processor, automatically extracting a quotation from a text document in a corpus of text documents indexed by the computing system;
by the computer processor, automatically identifying one or more entities that are referenced by the text document, each of the identified entities being electronically represented by the content recommendation system, wherein identifying the one or more entities includes recognizing and disambiguating a document reference to an entity by applying named entity recognition techniques, such that the document reference is linked to a representation of the entity stored in an entity repository that is identified by a unique identifier, and wherein identifying the one or more entities includes linking together multiple mentions of a same entity across the text document to identify an entity that is a speaker of the quotation and wherein the multiple mentions of the same entity are identified by the unique identifier;
by the computer processor, attributing the quotation to the speaker of the quotation by storing data that associates the quotation with the identified entity that is the speaker of the quotation; and
by the computer processor, in response to a request, providing the quotation by transmitting data that indicates the quotation and the attributed speaker.

2. The method of claim 1 wherein extracting the quotation includes dividing the text document into linguistic units including at least one of: a sentence, a phrase, a clause, and/or a paragraph.

3. The method of claim 1 wherein extracting the quotation includes performing parts-of-speech tagging on sentences of the text document.

4. The method of claim 1 wherein extracting the quotation includes performing parts-of-speech tagging on at least one sentence of the text document.

5. The method of claim 1 wherein extracting the quotation includes determining grammatical roles including subjects, verbs, and objects of sentences of the text document.

6. The method of claim 1 wherein extracting the quotation includes detecting punctuation indicating a beginning or end of the quotation.

7. The method of claim 1 wherein extracting the quotation includes detecting a quotation verb by determining whether a verb in a sentence of the text document is one of a predetermined list of quotation verbs.

8. The method of claim 1 wherein the linking together multiple mentions of a same entity across one of the text documents includes at least one of resolving a pronoun coreference, resolving references and/or abbreviations, and/or resolving definite noun or pronoun anaphora.

9. The method of claim 1 wherein extracting quotations includes determining a speaker, verb, quote triple for each of the extracted quotations.

10. The method of claim 1 wherein extracting the quotation includes identifying a speaker for a quotation by identifying a subject of a sentence in the text document.

11. The method of claim 1 wherein extracting the quotation includes identifying a verb for the quotation by identifying a verb of a sentence in the text document.

12. The method of claim 1, further comprising indexing the extracted quotation.

13. The method of claim 12 wherein indexing the extracted quotation includes storing a speaker-verb-quote triple in an inverted index managed by the content recommendation system.

14. The method of claim 12 wherein indexing the extracted quotation includes storing at least one of: a reference to a subject entity; a facet associated with a subject entity; subject modifiers; an action; an action modifier; and/or one or more references to object entities and/or facets that are referenced within the quotation.

15. The method of claim 1 further comprising receiving a quotation search request that includes a query, and determining whether the quotation matches the query.

16. The method of claim 15 wherein providing the quotation includes:
   determining multiple quotations that match the query; and
   ranking the multiple quotations based on one or more factors.

17. The method of claim 15 wherein the query specifies a speaker by including at least one of: an entity reference, a facet reference, and/or any speaker.

18. The method of claim 15 wherein the query specifies a subject by including at least one of: an entity reference, a facet reference, one or more key terms, and/or any subject.

19. The method of claim 1 wherein providing the quotation includes presenting at least one of: a quotation; an attribution; a context including text surrounding a quotation; or document metadata including title, publication date, and/or author.

20. A computing system configured to recommend content, comprising:
   a memory;
   a computer processor;
   a quotation extractor stored on the memory that is configured, when executed by the computer processor, to automatically:
      extract a quotation from a text document in a corpus of text documents;
      identify one or more entities that are referenced by the text document, each of the identified entities being electronically represented by the content recommendation system, wherein identifying the one or more entities includes recognizing and disambiguating a document reference to an entity by applying named entity recognition techniques, such that the document reference is linked to a representation of the entity stored in an entity repository that is identified by a unique identifier, and wherein identifying the one or more entities includes linking together multiple mentions of a same entity across the text document to identify an entity that is a speaker of the quotation and wherein the multiple mentions of the same entity are identified by the unique identifier; and
      attributing the quotation to the speaker of the quotation by storing data that associates the quotation with the identified entity that is the speaker of the quotation; and
   a quotation provider that is configured, in response to a request, to provide the quotation by transmitting data that indicates the quotation and the attributed speaker.

21. The computing system of claim 20 further configured to recommend content items to at least one of a desktop computing system, a personal digital assistant, a smart phone, a laptop computer, a mobile application, and/or a third-party application.

22. A non-transitory computer-readable medium storing instructions that, when executed by a computer processor, cause a computing system to automatically recommend content, by performing a method comprising:
   automatically extracting a quotation from a text document in a corpus of text documents;
   automatically identifying one or more entities that are referenced by the text document, each of the identified entities being electronically represented by the content recommendation system, wherein identifying the one or more entities includes recognizing and disambiguating a document reference to an entity by applying named entity recognition techniques, such that the document reference is linked to a representation of the entity stored in an entity repository that is identified by a unique identifier, and wherein identifying the one or more entities includes linking together multiple mentions of a same entity across the text document to identify an entity that is a speaker of the quotation and wherein the multiple mentions of the same entity are identified by the unique identifier;
   providing, in response to a request, the quotation by transmitting data that indicates the quotation and the attributed speaker.

* * * * *

UNITED STATES PATENT AND TRADEMARK OFFICE
CERTIFICATE OF CORRECTION

PATENT NO. : 9,501,468 B2  
APPLICATION NO. : 14/748137  
DATED : November 22, 2016  
INVENTOR(S) : Jisheng Liang et al.

Page 1 of 1

It is certified that error appears in the above-identified patent and that said Letters Patent is hereby corrected as shown below:

In Column 36, Line 54, Claim 22, insert --and-- after the ";".

Signed and Sealed this
Twenty-first Day of March, 2017

Michelle K. Lee
*Director of the United States Patent and Trademark Office*